United States Patent
Lagerstedt et al.

(10) Patent No.: US 10,050,948 B2
(45) Date of Patent: Aug. 14, 2018

(54) PRESENCE-BASED CREDENTIAL UPDATING

(71) Applicant: ASSA ABLOY AB, Stockholm (SE)

(72) Inventors: Stig Lagerstedt, Richardson, TX (US); Daniel Berg, Sundbyberg (SE); Daniel Bailin, Castle Rock, CO (US); Mark Robinton, Lebanon, NH (US); Masha Leah Davis, Austin, TX (US)

(73) Assignee: ASSA ABLOY AB (SE)

( * ) Notice: Subject to any disclaimer, the term of this patent is extended or adjusted under 35 U.S.C. 154(b) by 0 days.

(21) Appl. No.: 14/416,323

(22) PCT Filed: Jul. 26, 2013

(86) PCT No.: PCT/IB2013/002110
§ 371 (c)(1),
(2) Date: Jan. 22, 2015

(87) PCT Pub. No.: WO2014/016695
PCT Pub. Date: Jan. 30, 2014

(65) Prior Publication Data
US 2015/0200925 A1 Jul. 16, 2015

Related U.S. Application Data

(60) Provisional application No. 61/676,725, filed on Jul. 27, 2012.

(51) Int. Cl.
*H04L 29/06* (2006.01)
*H04W 12/04* (2009.01)
*H04W 12/08* (2009.01)

(52) U.S. Cl.
CPC .......... *H04L 63/08* (2013.01); *H04L 63/0492* (2013.01); *H04L 63/062* (2013.01);
(Continued)

(58) Field of Classification Search
CPC ... H04L 63/08; H04L 63/0492; H04L 63/062; H04L 63/107; H04W 12/04; H04W 12/08; G06F 21/45
(Continued)

(56) References Cited

U.S. PATENT DOCUMENTS

| | | | |
|---|---|---|---|
| 4,235,101 A | 11/1980 | Stadelmann | |
| 4,338,493 A | 7/1982 | Stenhuis et al. | |

(Continued)

FOREIGN PATENT DOCUMENTS

| | | |
|---|---|---|
| CA | 2606067 | 4/2008 |
| CN | 1426073 | 11/2001 |

(Continued)

OTHER PUBLICATIONS

U.S. Appl. No. 14/416,364, filed Jan. 22, 2015, Lagerstedt et al.
(Continued)

*Primary Examiner* — Eleni A Shiferaw
*Assistant Examiner* — Shahriar Zarrineh
(74) *Attorney, Agent, or Firm* — Sheridan Ross P.C.

(57) ABSTRACT

Methods, systems, and devices for updating access permissions of users in an access control system are described. The access permissions are capable of being updated based on rules and thresholds that include as at least one variable presence or contextual information associated with a user. The presence or contextual information associated with a user may be analyzed to trigger a credential update process for that user or other users within the access control system.

20 Claims, 7 Drawing Sheets

(52) U.S. Cl.
CPC ........... *H04W 12/04* (2013.01); *H04L 63/107* (2013.01); *H04W 12/08* (2013.01)

(58) Field of Classification Search
USPC .......................................................... 726/6
See application file for complete search history.

(56) References Cited

U.S. PATENT DOCUMENTS

| | | | |
|---|---|---|---|
| 4,497,031 A | 1/1985 | Froehling et al. | |
| 4,557,072 A | 12/1985 | Rittmeister et al. | |
| 4,850,040 A | 7/1989 | Teich et al. | |
| D327,642 S | 7/1992 | Foubister | |
| 5,128,792 A | 7/1992 | Teich et al. | |
| D330,507 S | 10/1992 | Foubister | |
| 5,153,560 A | 10/1992 | Ichikawa | |
| D331,409 S | 12/1992 | Goldsmith et al. | |
| 5,321,963 A | 6/1994 | Goldman et al. | |
| 5,344,068 A | 9/1994 | Haessig | |
| 5,395,042 A | 3/1995 | Riley et al. | |
| 5,544,321 A * | 8/1996 | Theimer | G06F 21/35 |
| | | | 380/258 |
| 5,544,809 A | 8/1996 | Keating et al. | |
| 5,591,950 A | 1/1997 | Imedio-Ocana | |
| 5,610,489 A | 3/1997 | Hart et al. | |
| 5,620,137 A | 4/1997 | Coelho et al. | |
| 5,628,777 A | 5/1997 | Moberg et al. | |
| 5,629,981 A * | 5/1997 | Nerlikar | G06K 7/0008 |
| | | | 340/10.31 |
| 5,636,264 A | 6/1997 | Sulavuori et al. | |
| 5,709,134 A | 1/1998 | Ulm | |
| 5,733,188 A | 3/1998 | Jacob | |
| 5,909,378 A | 6/1999 | De Milleville | |
| 5,934,554 A | 8/1999 | Charles et al. | |
| 6,026,303 A | 2/2000 | Minamisawa | |
| 6,031,825 A | 2/2000 | Kaikuranta et al. | |
| 6,141,595 A | 10/2000 | Gloudeman et al. | |
| 6,160,881 A | 12/2000 | Beyda et al. | |
| 6,185,483 B1 | 2/2001 | Drees | |
| 6,194,997 B1 | 2/2001 | Buchner et al. | |
| 6,226,515 B1 | 5/2001 | Pauli et al. | |
| 6,290,140 B1 | 9/2001 | Pesko et al. | |
| 6,313,745 B1 * | 11/2001 | Suzuki | G06K 7/0008 |
| | | | 340/568.1 |
| 6,400,961 B1 | 6/2002 | Lillie et al. | |
| 6,442,211 B1 | 8/2002 | Hampel et al. | |
| 6,462,663 B1 | 10/2002 | Wilson et al. | |
| 6,478,084 B1 | 11/2002 | Kumar et al. | |
| 6,486,778 B2 | 11/2002 | Mahler et al. | |
| 6,536,675 B1 | 3/2003 | Pesko et al. | |
| 6,549,643 B1 | 4/2003 | Toklu et al. | |
| 6,578,888 B1 | 6/2003 | Fayngersh et al. | |
| 6,580,354 B1 | 6/2003 | Schweiger et al. | |
| 6,657,316 B1 | 12/2003 | Smith et al. | |
| 6,664,710 B1 | 12/2003 | Gottlieb et al. | |
| 6,668,058 B2 | 12/2003 | Grimes | |
| D484,883 S | 1/2004 | Metivier et al. | |
| 6,685,257 B1 | 2/2004 | Beland et al. | |
| 6,731,200 B2 | 5/2004 | Wagner et al. | |
| 6,734,648 B2 | 5/2004 | Fukumura et al. | |
| 6,772,049 B2 | 8/2004 | Choi | |
| 6,825,662 B2 | 11/2004 | Nistler et al. | |
| 6,825,761 B2 | 11/2004 | Christ et al. | |
| 6,828,755 B1 | 12/2004 | Iverson et al. | |
| 6,832,072 B2 | 12/2004 | Buckingham et al. | |
| 6,851,067 B2 | 2/2005 | Indefrey et al. | |
| 6,870,340 B2 | 3/2005 | Fukumura et al. | |
| 6,883,420 B2 | 4/2005 | Kuttalek | |
| 6,883,515 B2 | 4/2005 | Kuttalek | |
| 6,895,791 B2 | 5/2005 | Alexander et al. | |
| 6,904,905 B2 | 6/2005 | Kuttalek | |
| 6,907,300 B2 | 6/2005 | O'Mahoney et al. | |
| D512,297 S | 12/2005 | Metivier et al. | |
| D512,898 S | 12/2005 | Metivier et al. | |
| 6,972,660 B1 * | 12/2005 | Montgomery, Jr. | G07C 9/00158 |
| | | | 340/5.52 |
| 6,975,202 B1 * | 12/2005 | Rodriguez | G07C 9/00103 |
| | | | 340/10.1 |
| 6,975,212 B2 | 12/2005 | Crenshaw et al. | |
| 7,007,985 B2 | 3/2006 | Alexander et al. | |
| D520,848 S | 5/2006 | Metivier et al. | |
| 7,043,063 B1 | 5/2006 | Noble et al. | |
| 7,053,757 B2 | 5/2006 | Buckingham et al. | |
| 7,058,477 B1 | 6/2006 | Rosen | |
| 7,061,393 B2 | 6/2006 | Buckingham et al. | |
| D526,556 S | 8/2006 | Metivier et al. | |
| 7,091,831 B2 | 8/2006 | Crenshaw et al. | |
| 7,123,139 B2 | 10/2006 | Sweeney | |
| 7,127,369 B2 | 10/2006 | Fukumura et al. | |
| D532,421 S | 11/2006 | Metivier et al. | |
| 7,142,112 B2 | 11/2006 | Buckingham et al. | |
| 7,149,503 B2 | 12/2006 | Aarnio et al. | |
| 7,170,395 B2 | 1/2007 | Crenshaw et al. | |
| 7,216,032 B2 | 5/2007 | Graf et al. | |
| 7,236,572 B2 | 6/2007 | Maschke | |
| 7,245,938 B2 | 7/2007 | Sobczak et al. | |
| 7,248,718 B2 | 7/2007 | Comaniciu et al. | |
| 7,290,288 B2 * | 10/2007 | Gregg | G06F 21/335 |
| | | | 705/51 |
| 7,304,406 B2 | 12/2007 | Behringer | |
| 7,317,970 B2 | 1/2008 | Pienta et al. | |
| 7,319,280 B1 | 1/2008 | Landry et al. | |
| 7,333,003 B1 | 2/2008 | Landry et al. | |
| 7,337,409 B2 | 2/2008 | Doblmayr et al. | |
| 7,356,086 B1 | 4/2008 | Landry et al. | |
| D569,279 S | 5/2008 | Krebs et al. | |
| 7,380,210 B2 | 5/2008 | Lontka et al. | |
| 7,391,224 B2 | 6/2008 | Wild | |
| RE40,492 E | 9/2008 | Grimes et al. | |
| 7,421,247 B2 | 9/2008 | Buckingham et al. | |
| 7,444,201 B2 | 10/2008 | Dirnfeldner | |
| 7,466,841 B2 | 12/2008 | Bahlmann et al. | |
| 7,483,397 B2 | 1/2009 | Meier et al. | |
| 7,505,450 B2 | 3/2009 | Castagnoli | |
| 7,515,033 B2 | 4/2009 | Roosli et al. | |
| 7,519,378 B2 | 4/2009 | Goertz et al. | |
| 7,519,379 B2 | 4/2009 | Goertz et al. | |
| 7,528,704 B2 | 5/2009 | Das et al. | |
| 7,536,437 B2 * | 5/2009 | Zmolek | H04L 63/08 |
| | | | 455/456.1 |
| 7,558,402 B2 | 7/2009 | Zhou et al. | |
| 7,564,842 B2 | 7/2009 | Callaway, Jr. et al. | |
| 7,610,534 B1 * | 10/2009 | Jacobson | G01B 31/318536 |
| | | | 714/726 |
| 7,639,841 B2 | 12/2009 | Zhu | |
| 7,643,908 B2 | 1/2010 | Quirino et al. | |
| 7,664,840 B2 | 2/2010 | O'Neal et al. | |
| 7,706,778 B2 | 4/2010 | Lowe | |
| 8,074,271 B2 * | 12/2011 | Davis | G06F 21/31 |
| | | | 713/185 |
| 8,102,799 B2 | 1/2012 | Alexander et al. | |
| 8,112,794 B2 * | 2/2012 | Little | H04L 63/0853 |
| | | | 380/270 |
| 8,495,722 B1 * | 7/2013 | McCusker | H04W 12/08 |
| | | | 726/10 |
| 8,504,097 B1 * | 8/2013 | Cope | H04M 1/7253 |
| | | | 455/550.1 |
| 8,683,560 B1 * | 3/2014 | Brooker | H04L 63/08 |
| | | | 713/155 |
| 8,730,004 B2 | 5/2014 | Elfstrom et al. | |
| 9,124,437 B2 * | 9/2015 | Brisco | H04L 12/1859 |
| 9,160,727 B1 * | 10/2015 | Saylor | H04L 63/08 |
| 9,332,432 B2 * | 5/2016 | Low | H04W 12/06 |
| 2002/0131374 A1 | 9/2002 | Lee | |
| 2003/0087678 A1 | 5/2003 | Smith et al. | |
| 2003/0130960 A1 * | 7/2003 | Fraser | G06Q 20/3821 |
| | | | 705/75 |
| 2003/0149576 A1 * | 8/2003 | Sunyich | G06Q 30/02 |
| | | | 705/5 |
| 2003/0194350 A1 | 10/2003 | Stamatelos et al. | |
| 2004/0022334 A1 | 2/2004 | Roosli et al. | |

(56) References Cited

U.S. PATENT DOCUMENTS

| | | |
|---|---|---|
| 2004/0059815 A1 | 3/2004 | Buckingham et al. |
| 2004/0083128 A1 | 4/2004 | Buckingham et al. |
| 2004/0180646 A1* | 9/2004 | Donley .................. H04M 1/66 455/411 |
| 2004/0192423 A1 | 9/2004 | Nevermann |
| 2004/0203356 A1 | 10/2004 | Takatori et al. |
| 2004/0208151 A1* | 10/2004 | Haverinen ............. H04L 29/12 370/338 |
| 2004/0215723 A1 | 10/2004 | Chadha |
| 2004/0227623 A1 | 11/2004 | Pozsgay |
| 2004/0233928 A1 | 11/2004 | Pozsgay |
| 2004/0242202 A1 | 12/2004 | Torvinen |
| 2004/0246256 A1 | 12/2004 | Parakkuth et al. |
| 2004/0260611 A1 | 12/2004 | Raz et al. |
| 2004/0260612 A1 | 12/2004 | Raz et al. |
| 2005/0001557 A1 | 1/2005 | Walko, Jr. et al. |
| 2005/0029867 A1 | 2/2005 | Wood |
| 2005/0044402 A1* | 2/2005 | Libin ................ G07C 9/00039 726/26 |
| 2005/0091338 A1* | 4/2005 | de la Huerga ........ A61J 1/1437 709/217 |
| 2005/0108417 A1 | 5/2005 | Haumont |
| 2005/0120727 A1 | 6/2005 | Flinner et al. |
| 2005/0193932 A1 | 9/2005 | Denison et al. |
| 2005/0198179 A1 | 9/2005 | Savilampi |
| 2005/0204167 A1* | 9/2005 | Conlin ............... G07C 9/00007 726/5 |
| 2005/0206725 A1 | 9/2005 | Buckingham et al. |
| 2005/0242970 A1 | 11/2005 | Blaker et al. |
| 2005/0248441 A1 | 11/2005 | Crenshaw et al. |
| 2005/0253690 A1 | 11/2005 | Crenshaw et al. |
| 2005/0266798 A1 | 12/2005 | Moloney et al. |
| 2005/0285445 A1 | 12/2005 | Wruck et al. |
| 2006/0010442 A1* | 1/2006 | Desai ...................... H04L 63/10 718/100 |
| 2006/0019637 A1 | 1/2006 | Becker et al. |
| 2006/0063523 A1 | 3/2006 | McFarland |
| 2006/0064477 A1 | 3/2006 | Renkis |
| 2006/0082454 A1 | 4/2006 | Fukuda et al. |
| 2006/0097843 A1* | 5/2006 | Libin ................ G07C 9/00103 340/5.28 |
| 2006/0100002 A1 | 5/2006 | Luebke et al. |
| 2006/0106499 A1 | 5/2006 | Roosli et al. |
| 2006/0107307 A1* | 5/2006 | Knox .................. H04L 63/0492 726/2 |
| 2006/0124541 A1 | 6/2006 | Logan et al. |
| 2006/0132301 A1 | 6/2006 | Stilp |
| 2006/0158344 A1 | 7/2006 | Bambini et al. |
| 2006/0164205 A1 | 7/2006 | Buckingham et al. |
| 2006/0164206 A1 | 7/2006 | Buckingham et al. |
| 2006/0193310 A1 | 8/2006 | Landry et al. |
| 2006/0193313 A1 | 8/2006 | Landry et al. |
| 2006/0193336 A1 | 8/2006 | Landry et al. |
| 2006/0203295 A1 | 9/2006 | D'Silva et al. |
| 2006/0224901 A1* | 10/2006 | Lowe ..................... H04L 63/062 713/186 |
| 2007/0050240 A1 | 3/2007 | Belan et al. |
| 2007/0057810 A1 | 3/2007 | Bos et al. |
| 2007/0097993 A1 | 5/2007 | Bojahra et al. |
| 2007/0102511 A1* | 5/2007 | Park ....................... G06Q 20/18 235/382 |
| 2007/0103550 A1 | 5/2007 | Frank et al. |
| 2007/0115827 A1 | 5/2007 | Boehnke et al. |
| 2007/0130294 A1* | 6/2007 | Nishio ..................... H04L 41/00 709/219 |
| 2007/0206537 A1 | 9/2007 | Cam-Winget et al. |
| 2007/0223596 A1 | 9/2007 | Fan |
| 2007/0233323 A1 | 10/2007 | Wiemeye et al. |
| 2007/0239374 A1 | 10/2007 | Dougherty et al. |
| 2008/0008157 A1* | 1/2008 | Edge ...................... H04W 4/22 370/351 |
| 2008/0074059 A1 | 3/2008 | Ahmed |
| 2008/0076346 A1 | 3/2008 | Ahmed |
| 2008/0083234 A1 | 4/2008 | Krebs et al. |
| 2008/0083834 A1 | 4/2008 | Krebs et al. |
| 2008/0099570 A1 | 5/2008 | Krebs et al. |
| 2008/0160984 A1* | 7/2008 | Benes .................. H04M 1/7253 455/419 |
| 2008/0163361 A1* | 7/2008 | Davis ....................... G06F 21/31 726/19 |
| 2008/0175210 A1 | 7/2008 | Jamieson |
| 2008/0219444 A1* | 9/2008 | Benteo ..................... H04L 9/0869 380/255 |
| 2008/0283621 A1 | 11/2008 | Quirino et al. |
| 2008/0289025 A1* | 11/2008 | Schneider ............. H04L 63/123 726/10 |
| 2009/0001069 A1 | 1/2009 | Bally et al. |
| 2009/0032010 A1 | 2/2009 | Hoffmeier |
| 2009/0037985 A1* | 2/2009 | Bentley ..................... H04L 63/08 726/5 |
| 2009/0040038 A1 | 2/2009 | Huber |
| 2009/0055561 A1 | 2/2009 | Ritz et al. |
| 2009/0055911 A1* | 2/2009 | Hulusi ................ G07C 9/00103 726/6 |
| 2009/0082015 A1* | 3/2009 | Ravi ...................... H04W 12/08 455/433 |
| 2009/0096623 A1 | 4/2009 | Roosli |
| 2009/0119698 A1* | 5/2009 | Kuijlaars ............ G07C 9/00103 725/25 |
| 2009/0299777 A1* | 12/2009 | Silberman .............. G06Q 10/02 705/5 |
| 2009/0300988 A1 | 12/2009 | Bern |
| 2010/0031334 A1* | 2/2010 | Shaikh .................... G06F 21/35 726/7 |
| 2010/0091968 A1* | 4/2010 | Reid .................... H04M 3/42314 379/207.02 |
| 2010/0102962 A1 | 4/2010 | Hick |
| 2010/0198721 A1 | 8/2010 | Caredda |
| 2010/0216430 A1* | 8/2010 | Brown .................. H04L 63/062 455/411 |
| 2010/0259388 A1* | 10/2010 | Menzel ................ H04B 5/0031 340/572.1 |
| 2011/0053504 A1* | 3/2011 | Corda ....................... G06F 21/35 455/41.1 |
| 2011/0058657 A1* | 3/2011 | Alegret ................... H04L 63/08 379/32.04 |
| 2011/0166995 A1* | 7/2011 | Fuerstenberg ......... G06Q 10/10 705/40 |
| 2011/0181412 A1 | 7/2011 | Alexander et al. |
| 2011/0187505 A1* | 8/2011 | Faith ..................... G06F 1/1694 340/10.1 |
| 2011/0202185 A1 | 8/2011 | Imes et al. |
| 2011/0223886 A1* | 9/2011 | Nasielski .............. H04L 63/101 455/411 |
| 2011/0271331 A1* | 11/2011 | Adams .................. H04L 63/0853 726/6 |
| 2011/0314492 A1* | 12/2011 | Cassidy .................. H04N 7/106 725/30 |
| 2012/0083305 A1 | 1/2012 | Alexander et al. |
| 2012/0077431 A1 | 3/2012 | Fyke et al. |
| 2012/0083324 A1* | 4/2012 | Perea-OcHoa ..... G07F 17/3223 463/11 |
| 2013/0061303 A1* | 3/2013 | Hart ....................... G06F 21/33 726/6 |
| 2014/0096204 A1* | 4/2014 | Hoesl ..................... G06F 21/62 726/4 |
| 2014/0278609 A1* | 9/2014 | Capps ................... G06Q 20/208 705/5 |
| 2015/0040198 A1* | 2/2015 | Gopalakrishnan .... H04L 63/102 726/5 |
| 2015/0236857 A1* | 8/2015 | Feltham ............... H04L 63/0414 380/270 |

FOREIGN PATENT DOCUMENTS

| | | |
|---|---|---|
| CN | 101056262 | 10/2007 |
| DE | 4435812 | 2/1996 |
| DE | 10033754 | 1/2002 |
| DE | 10163012 | 7/2003 |
| DE | 20220204 | 4/2004 |

(56) References Cited

FOREIGN PATENT DOCUMENTS

| | | |
|---|---|---|
| DE | 202004004351 | 6/2004 |
| DE | 20122249 | 12/2004 |
| DE | 102004013623 | 10/2005 |
| DE | 102004020822 | 10/2005 |
| EP | 0625767 | 11/1994 |
| EP | 0824043 | 2/1998 |
| EP | 1111635 | 6/2001 |
| EP | 1129653 | 9/2001 |
| EP | 1343011 | 9/2003 |
| EP | 1439495 | 7/2004 |
| EP | 1439498 | 7/2004 |
| EP | 1480399 | 11/2004 |
| EP | 1545053 | 6/2005 |
| EP | 1644600 | 4/2006 |
| EP | 1758335 | 2/2007 |
| EP | 1835661 | 9/2007 |
| EP | 1837792 | 9/2007 |
| EP | 1956450 | 8/2008 |
| EP | 1993065 | 11/2008 |
| GB | 521419 | 5/1940 |
| GB | 623650 | 5/1949 |
| GB | 1214690 | 12/1967 |
| GB | 1243410 | 8/1968 |
| GB | 2339838 | 2/2000 |
| KR | 100736546 | 6/2007 |
| WO | WO 90/13954 | 11/1990 |
| WO | WO 91/07011 | 6/1991 |
| WO | WO 92/006455 | 4/1992 |
| WO | WO 95/003086 | 2/1995 |
| WO | WO 95/022725 | 8/1995 |
| WO | WO 98/012880 | 3/1998 |
| WO | WO 98/026592 | 6/1998 |
| WO | WO 00/21053 | 4/2000 |
| WO | WO 00/038205 | 6/2000 |
| WO | WO 00/043329 | 7/2000 |
| WO | WO 02/07387 | 1/2002 |
| WO | WO 02/059764 | 8/2002 |
| WO | WO 02/060111 | 8/2002 |
| WO | WO 02/065673 | 8/2002 |
| WO | WO 03/006279 | 1/2003 |
| WO | WO 03/023936 | 3/2003 |
| WO | WO 03/024077 | 3/2003 |
| WO | WO 03/096261 | 11/2003 |
| WO | WO 03/096292 | 11/2003 |
| WO | WO 03/105356 | 12/2003 |
| WO | WO 2004/010399 | 1/2004 |
| WO | WO 2004/017621 | 2/2004 |
| WO | WO 2004/028981 | 4/2004 |
| WO | WO 2004/043033 | 5/2004 |
| WO | WO 2004/057851 | 7/2004 |
| WO | WO 2004/066218 | 8/2004 |
| WO | WO 2004/081875 | 9/2004 |
| WO | WO 2004/086675 | 10/2004 |
| WO | WO 2004/102983 | 11/2004 |
| WO | WO 2004/109554 | 12/2004 |
| WO | WO 2004/110083 | 12/2004 |
| WO | WO 2004/114049 | 12/2004 |
| WO | WO 2005/004420 | 1/2005 |
| WO | WO 2005/073742 | 8/2005 |
| WO | WO 2005/079517 | 9/2005 |
| WO | WO 2005/079536 | 9/2005 |
| WO | WO 2005/079539 | 9/2005 |
| WO | WO 2005/081189 | 9/2005 |
| WO | WO 2005/081561 | 9/2005 |
| WO | WO 2005/109668 | 11/2005 |
| WO | WO 2005/109669 | 11/2005 |
| WO | WO 2006/009973 | 1/2006 |
| WO | WO 2006/015473 | 2/2006 |
| WO | WO 2006/018369 | 2/2006 |
| WO | WO 2006/020125 | 2/2006 |
| WO | WO 2006/021592 | 3/2006 |
| WO | WO 2006/022910 | 3/2006 |
| WO | WO 2006/067271 | 6/2006 |
| WO | WO 2006/072617 | 7/2006 |
| WO | WO 2006/093771 | 9/2006 |
| WO | WO 2006/093772 | 9/2006 |
| WO | WO 2006/093773 | 9/2006 |
| WO | WO 2006/101614 | 9/2006 |
| WO | WO 2006/101615 | 9/2006 |
| WO | WO 2008/019942 | 2/2008 |
| WO | WO 2008/024306 | 2/2008 |
| WO | WO 2008/024985 | 2/2008 |
| WO | WO 2008/025007 | 2/2008 |
| WO | WO 2008/027830 | 3/2008 |
| WO | WO 2008/046365 | 4/2008 |
| WO | WO 2008/048933 | 4/2008 |
| WO | WO 2008/052178 | 5/2008 |
| WO | WO 2008/115184 | 9/2008 |
| WO | WO 2008/121181 | 10/2008 |
| WO | WO 2008/144488 | 11/2008 |
| WO | WO 2009/018215 | 2/2009 |
| WO | WO 2011/121299 | 10/2011 |
| WO | WO 2011/149600 | 12/2011 |

OTHER PUBLICATIONS

U.S. Appl. No. 14/417,645, filed Jan. 27, 2015, Lagerstedt et al.
"About Near Field Communication," NFC Forum, © 2005, 3 pages.
Brogan "Samsung Galaxy S III Holiday Inn app offers remote hotel Olympic experience," Pocket-lint, Jul. 25, 2012, 5 pages [retrieved from: http://www.pocket-lint.com/news/116433-samsung-galaxy-s-iii-holiday-inn-olympic-app].
Extreme Sensors, "Sensor Networks Make Early Inroads" retrieved from internet site http://www.extremesensors.com/print_article/Sensor+Networks+Make+Early+Inroads/1411 . . . on Sep. 6, 2006, 6 pages.
Ember Corporation, "Easy ZigBee on track with Telegesis and Ember" Feb. 1, 2006, 3 pages.
International Search Report and Written Opinion for International (PCT) Patent Application No. PCT/IB2013/002110, dated Jan. 21, 2014 9 pages.
International Preliminary Report on Patentability for International (PCT) Patent Application No. PCT/IB2013/002110, dated Feb. 5, 2015 6 pages.
International Search Report and Written Opinion for International (PCT) Patent Application No. PCT/IB2013/002379, dated Jul. 11, 2014 16 pages.
International Preliminary Report on Patentability for International (PCT) Patent Application No. PCT/IB2013/002379, dated Feb. 5, 2015 10 pages.
International Search Report and Written Opinion for International (PCT) Patent Application No. PCT/IB2013/002144, dated Jan. 22, 2014 9 pages.
International Preliminary Report on Patentability for International (PCT) Patent Application No. PCT/IB2013/002144, dated Feb. 5, 2015 6 pages.

* cited by examiner

PRESENCE-BASED CREDENTIAL UPDATING

CROSS REFERENCE TO RELATED APPLICATION

This application is a national stage application under 35 U.S.C. 371 of PCT Application No. PCT/IB2013/002110 having an international filing date of Jul. 26, 2013, which designated the United States, which PCT application claimed the benefit of U.S. Application Ser. No. 61/676,725, filed Jul. 27, 2012, both of which are incorporated by reference in their entirety.

FIELD OF THE DISCLOSURE

The present disclosure is generally directed toward access control systems and specifically toward updating access-control permissions in the same.

BACKGROUND

Radio frequency identification (RFID) devices, such as contactless smart cards, proximity cards, key fobs, tags, etc., store credential information that can be used to gain access to an asset. When presented to a reader, the RFID device and reader typically perform mutual authentication with one another before the RFID device transmits the stored credential information for analysis and verification by the reader. The reader analyzes the credential information and determines if the RFID device being presented is valid and permitted to access an asset protected by the reader. If the reader determines that the credential information on the RFID device is valid, then the reader initiates any number of actions allowing the holder of the RFID device access to the asset protected by the reader.

Near Field Communication (NFC) is a communication protocol that is showing great promise for communication between devices at short range. NFC may be regarded as the same protocol that is used by contactless smart cards working at approximately 13.56 MHz. Indeed, mobile communication devices such as smart phones, tablets, laptops, and the like are being developed to support NFC communications. NFC standards cover communications protocols and data exchange formats, and are based on existing RFID standards including ISO 14443 and ISO 18092, each of which are hereby incorporated herein by reference in their entirety.

The protocol used in NFC can vary depending on the mode of operation employed by the NFC chip and reader. For example, if an active NFC mode is used, both a reader and target (e.g., RFID device) are using their own RF field to enable communication between each other. A reader is powered to generate an RF filed of a particular frequency, for instance at 13.56 MHz. The target has its own power supply for digital processing and communications. When the target receives a communication from a reader, the target uses its own power supply to generate another RF field to answer the reader. Communications can occur back and forth between the reader and target in this fashion.

Alternatively, if a passive NFC mode is implemented, the target answers to a reader command in a load modulation scheme. The target is not inherently powered to generate its own RF field. Rather, the target uses energy from the RF field created by the reader to create its RF field and reply to be sent back to the reader.

If the NFC chip is coupled with a micro-processor, the chip may act like smart cards or the like where communication between a reader and card are performed to gain access to an asset. Typically, mobile communication devices employing NFC technology include a battery and the NFC chip can be powered by that battery. If the chip derives power from the battery, the NFC chip may communicate with a reader according to the active protocol described above. Alternatively, the NFC chip can communicate with a reader in a passive mode. This will eliminate the need for the chip to be powered by the battery of a mobile communication device, which may increase the life of the battery.

In most cellular communication systems (e.g., Global System for Mobile Communications (GSM) and variants thereof such as 3G, 4G, etc., General Packet Radio Service (GPRS), Code Division Multiple Access (CDMA), Evolution-Data Optimized (EV-DO), Enhanced Data Rates for GSM Evolution (EDGE), Digital Enhanced Cordless Telecommunications (DECT), Digital AMPS (IS-136/TDMA), and Integrated Digital Enhanced Network (iDEN)), the mobile communication devices are equipped with a Subscriber Identification Module (SIM) card or other type of secure element. The SIM card is typically used as a secure memory containing all of the owner's account information. It is also provided with additional space for storing other applications such as an electronic purse for e-commerce. This memory is often accessible from outside of the mobile communication device. Mobile communication devices carry a secure memory much like smart cards or the like and the new applications in NFC protocols enable the mobile communication device to perform functions like smart cards or other RFID devices. The ability to have a mobile communication device also operate as an RFID credential creates a variety of new applications for the device.

Typical smart cards or proximity cards are a small, usually credit card shaped, device that contains at least a memory device for storing credential information and a transceiver to communicate with a reader. The reader communicates through the transceiver on the smart card to access the stored information. The reader may simply read the information in many circumstances. In some situations, a reader may be configured to also provide writing capabilities, thereby allowing the reader to operate as a reader/writer and load credential information into the memory device or modify existing data in the memory device. For example, if the owner of a smart card uses a smart card containing financial information to make a purchase, the reader/writer can read the information including the owner's identity and the availability of funds. The reader/writer can also deduct the purchase amount from the available funds if it has writing capabilities. Further, the reader/writer can store transaction data on the smart card including the time and location of the transaction in addition to the identity of the reader/writer.

Smart cards have a variety of uses and can be utilized in any transaction that involves the exchange of data or information between individuals and an institution. For example, smart cards can be used to store information including medical records, financial information, vehicle maintenance information, pet information, and a virtually limitless variety of other information traditionally printed on paper or plastic or stored on cards having a magnetic stripe or an optical bar code. Smart card technology has been particularly useful in banking systems and other financial transaction systems.

Furthermore, smart cards have been widely used in access control systems. For example, a reader may control doors that provide access to particular assets. The reader only allows qualified individuals carrying smart cards, with proper credentials loaded thereon, access through control doors.

In a conventional access control system, the readers positioned at ingress/egress points are connected to a control panel. This control panel is kept up to date with the authorized codes corresponding to persons with authorized access to the location. When activity occurs, the control panel is updated with the activity information. For example, if the activity related to access gained through a particular door, the door and potentially the person who gained access are stored in the control panel log. Also, if the activity related to a financial transaction, the information relating to the transaction including transaction amount and who performed the transaction are sent and stored at the control panel. There are, however, circumstances in which control panels are not physically wired and in constant communication with readers at remote locations.

SUMMARY

U.S. Pat. No. 7,706,778 to Lowe, the entire contents of which are hereby incorporated herein by reference, describes some mechanisms for remotely assigning and revoking access credentials. The '778 patent specifically addresses many concerns raised in connection with maintaining readers that are situated in remote locations and, therefore, are not physically wired and in constant communication with a centralized control panel.

It is an aspect of the present disclosure to provide an improved access control system. Specifically, it is an aspect of the present disclosure to enable mobile communication devices and other types of RFID-enabled devices to have their credentials updated in a more sophisticated manner. Even more specifically, it is an aspect of the present disclosure to utilize presence information, contextual information, and the like in connection with updating credential information stored on a user device such as an NFC-enabled mobile communication device, a traditional RFID device, or the like.

In some embodiments, a method is provided which comprises:

receiving contextual information regarding a first user;

based on the received contextual information, determining a credential update to perform in connection with at least one device associated with the first user;

generating a first message that contains at least one instruction to update at least one credential, the at least one credential including at least one of a new and modified credential to be stored on the at least one device associated with the first user; and transmitting the first message to the at least one device associated with the first user.

In some embodiments, the updated credential may correspond to credential information for use in connection with a physical access control system. In some embodiments, the updated credential may correspond to credential information for use in connection with a logical access control system. In some embodiments, the updated credential may correspond to credential information for use in connection with a combination of a physical and logical access control system.

The contextual information, in some embodiments, may be received at a credential control authority from a contextual information source. Specifically, the contextual information source may be configured to monitor the activities of the first user across multiple platforms and based on detected activity, determine contextual information for the first user.

This contextual information can be provided to the credential control authority, where it is analyzed in connection with administering an access control system. In particular, the contextual information may correspond to a detection of the first user's presence at a particular physical location or at a particular logical location. If the first user's presence is determined to be more than a predetermined physical or logical distance away from one or more assets in the access control system, the credential control authority may perform a credential update routine whereby credentials associated with the first user are updated at least until the first user's presence is detected back within the predetermined physical or logical distance.

Embodiments of the present disclosure may be particularly well suited for use in connection with remote control over hotel access control systems. Specifically, a guest of a hotel may be allowed to request a remote check-in for their room or for multiple persons in their party (e.g., spouse, children, parents, friends, etc.). Rather than requiring the guest to walk to a front desk at the hotel to complete a check-in process and have their credential physically issued to them, the guest can utilize the remote check-in feature along with a presence-based updating of their credentials. More specifically, if the guest has elected to use a remote check-in feature and the guest is using a properly-equipped user device (e.g., an NFC-enabled communication device), the guest may have their credentials for the hotel issued to their user device when the guest's presence is detected within a predetermined physical or logical distance of the hotel.

Continuing this specific non-limiting example, the guest may arrive at an airport that is close to, but not within the predetermined physical distance of their hotel. Since the guest is not within the predetermined physical distance of their hotel, the guest may not have their credential for the hotel visit sent to their user device. However, as the guest begins traveling toward the hotel and finally crosses the predetermined physical distance threshold, a credential update process may be initiated whereby the guest's credentials for their hotel visit are transmitted to the guest's user device such that they can be used upon the guest's arrival at the hotel. As can be appreciated, the predetermined physical distance threshold may be based upon an absolute distance (e.g., X miles) or it may be based upon communication capabilities of a communication network administered by the hotel (e.g., the transmit distance of a cellular tower within range of the hotel, the transmit distance of an 802.11N router that is on the hotel premises, etc.). This remote check-in feature allows the guest to bypass the front desk of the hotel. It also allows the hotel to maintain stronger control over the dissemination of credentials to guests while still allowing the freedom of remote check-in. Specifically, the hotel is enabled to ensure that credentials are not transmitted until the guest's room is ready and the guest is within a predetermined distance.

In some embodiments, rather than transmitting new or modified credentials to a user device associated with a guest, it may be possible to transmit enable/disable commands for credentials stored on the user device based on the guest's presence information. Specifically, a valid credential may be transmitted to a guest's user device days or weeks before the guest is set to check into a hotel. However, these valid credentials may not be activated (e.g., become capable of being transmitted, accessed, and/or properly verified) until the appropriate time and until the guest's presence is detected within a predetermined distance of the hotel.

It should be appreciated that while may examples of updating a user's credential information based on contextual information will be described in connection with a hotel guest scenario, embodiments of the present disclosure are not so limited. Rather, embodiments of the present disclosure may apply to the operation of any type of access control system used for protecting any type of asset or collection of assets. Specifically, embodiments of the present disclosure can be used in connection with any type of access control system (e.g., physical and/or logical) that is used for protecting one or more assets of a business entity, a government entity, a collegiate entity, a non-profit entity, a virtual entity (e.g., a website or webservice), a cruise ship, a resort, an apartment complex, a housing development, a house, a collection of people, a single person, or the like.

Additionally, embodiments of the present disclosure are not necessarily limited to leveraging presence information in connection with updating access control credentials. Rather, credential information may alternatively, or additionally, be updated based on changes in many different types of contextual information for a user. More specifically, contextual information may be considered to include presence information as well as other information such as communication context information, location context information, group context information, calendar information, etc. Based on relevant contextual information, a credential update process may either be performed or not.

In addition to the method described above, embodiments of the present disclosure also contemplate an access control system that comprises:

a credential control authority configured to receive at least one of presence information and contextual information associated with a first user of the access control system and then determine whether a credential update process is to be performed for at least one device associated with the first user, the credential control authority further configured to invoke the credential update process upon determining that the first user has crossed at least one of a physical and logical boundary based on the received at least one of presence information and contextual information.

The present invention will be further understood from the drawings and the following detailed description. Although this description sets forth specific details, it is understood that certain embodiments of the invention may be practiced without these specific details. It is also understood that in some instances, well-known circuits, components and techniques have not been shown in detail in order to avoid obscuring the understanding of the invention.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the scope of the appended claims.

Specifically, embodiments of the present disclosure will be described in connection with updating access permissions, which may also be referred to as user permissions, access credentials, or the like. Moreover, while embodiments may reference to updating data for use in connection with accessing one or more assets in an access control system, those of ordinary skill in the art will appreciate that the concepts disclosed herein can be applied to updating data that is not necessarily used for obtaining access to an asset in an access control system. Rather, embodiments of the present disclosure may be applied to update data in communication systems or any other environment.

Figure 1:
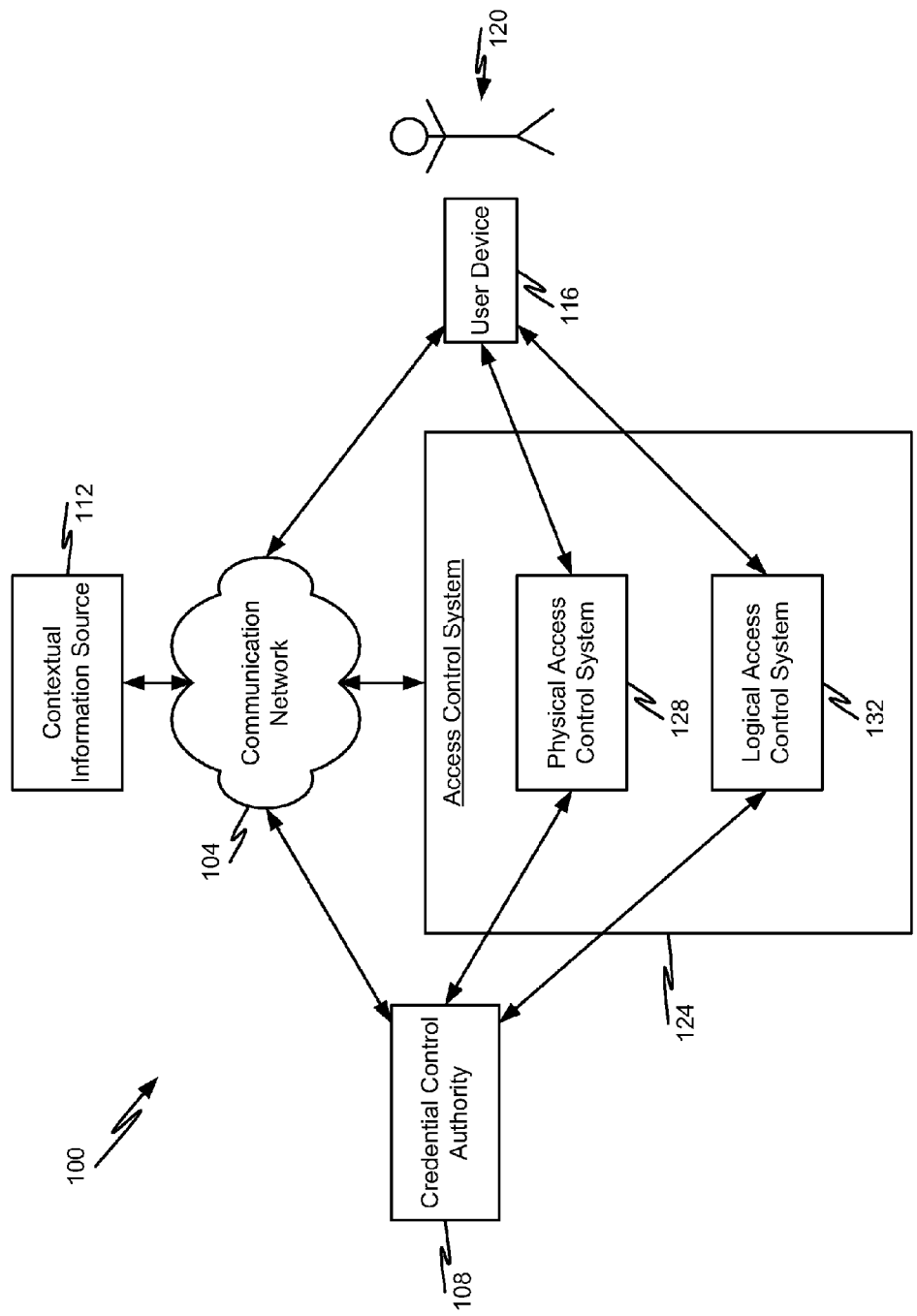
FIG. 1 is a block diagram depicting a communication system in accordance with embodiments of the present disclosure.

Referring initially to FIG. 1, a communication system 100 will be described in accordance with at least some embodiments of the present disclosure. The system 100 may include a communication network 104 that facilitates communications and/or message exchanges between various different communication-enabled devices. More specifically, the communication network 104 may provide communication capabilities between a credential control authority 108, a contextual information source 112, and one or more user devices 116. The communication network 104 may also provide communication capabilities between components of an access control system 124, the credential control authority 108, the contextual information source 112, and the one or more user devices 116.

The communication network 104 may be embodied as any type of distributed set of communication/processing devices. As some non-limiting examples, the communication network 104 may comprise a cellular communication network that utilizes any variation of cellular communication technology (e.g., any variant or generation of a GSM network, a DCS network, a PCS network, GPRS, CDMA, EV-DO, EDGE, DECT, TDMA, iDEN, etc.). Other examples of a suitable communication network 104 include, without limitation, a Local Area Network (LAN), multiple LANs, a Wide Area Network (WAN), an enhanced IP-based network, the Internet, a circuit-switched network, the Public Switched Telephone Network (PSTN), an Integrated Serviced Digital Network (ISDN), an IP Multimedia Subsystem (IMS) network, a satellite communication network, or combinations thereof.

The user device 116 may be associated with or otherwise be used by a user 120. In some embodiments, the user device 116 may correspond to a communication device that comprises a user interface. More specific, but non-limiting, examples of a user device 116 include a telephone, a mobile telephone, a cellular phone, a smart phone, a Personal Digital Assistant (PDA), a thin client computing device, a netbook, a tablet, or the like. Thus, the user device 116 may communicate with the other components of the communication system 100 via the protocols supported by the communication network 104. In particular, the user device 116 may comprise the capability to send messages across the communication network 104 to other devices as well as receive messages via the communication network 104 that have been transmitted by other devices connected to the communication network 104.

In addition to comprising communication capabilities, the user device 116 may also comprise the capability to directly communicate with components of the access control system 124. More specifically, the user device 116 may be configured to exchange credentials in the form of access permissions, sensitive data, cryptographic keys, shared secrets, etc. with a physical access control system (PACS) 128 and/or a logical access control system (LACS) 132. The PACS 128 and LACS 132 may comprise different components therein that control access to physical and/or logical assets, as appropriate, within the access control system 124. In some embodiments, the user device 116 may be configured to exchange communications with components of the PACS 128 and LACS 132 via wireless communication protocols, such as NFC protocols. As will be discussed in further detail herein, the user device 116 may comprise hardware that enables the user device 116 to behave like a traditional RFID device and exchange communications with the components of the PACS 128 and/or LACS 132 via inductive coupling. Alternatively, or in addition, the user device 116 may be equipped with one or more physical features (e.g., ports, electrical connectors, etc.) that enable the user device 116 to exchange communications via a contact-based or wired connection with the components of the PACS 128 and/or LACS 132.

In some embodiments, the credential control authority 108 may be configured to transmit updated access control credentials to the user device 116 and/or components of the access control system 124. The updated credentials may be transmitted from the credential control authority 108 directly to components of the access control system 124 (e.g., via protocols specific to the access control system) and/or the updated credentials may be transmitted from the credential control authority 108 to the components of the access control system 124 via the communication network 104. Likewise, the credential control authority 108 may transmit updated credentials to the user device 116 via the communication network 104.

In some embodiments, the user device 116 may communicate with the credential control authority 108 and receive credential updates therefrom via one or more of a Short Message Service (SMS) message, a Multimedia Message Service (MMS) message, or one or more packets transmitted via the TCP/IP suite of communication protocols (e.g., via email, a File Transfer Protocol (FTP) exchange, a Hyper Text Transfer Protocol (HTTP) exchange, or the like). Accordingly, the user device 116 may interact with the credential control authority 108 using cellular communication protocols and/or TCP/IP communication protocols.

The credential control authority 108 may be operated by the same entity that operates the access control system 124. In some embodiments, the credential control authority 108 may be triggered to send credential updates to the user device 116 and/or components of the access control system 124 in response to receiving certain predefined contextual information from the contextual information source 112. The contextual information source 112 may or may not be operated by the same entity that administers the credential control authority 108 and access control system 124.

In some embodiments, the contextual information source 112 comprises the capability to determine contextual information for the user 120. Contextual information for the user 120 can be determined by detecting and analyzing the user's 120 interaction with his/her user device 116. In some embodiments, a user 120 may have multiple different user devices (e.g., personal phone, work phone, personal computer, work computer, cellular phone, etc.). Contextual information for the user 120 can be obtained by the contextual information source 112 by monitoring which user device 116 the user 120 is currently interacting with, which user device(s) 116 the user 120 most recently interacted with, how the user 120 is interacting with certain user devices 116, and the like.

Contextual information obtained by the contextual information source 112 does not necessarily have to be limited to detecting a user's 120 interaction with a user device 116. Rather, contextual information can also include determining details of applications that are currently being used by the user 120. The applications being used by the user 120 may be located on the user device 116 or they may be located on servers (e.g., web servers) that are being accessed by the user 120 through the communication network 104. The types of applications with which the user 120 is currently interacting may also impact the contextual information determined by the contextual information source 112 an provided to the credential control authority 108. This interaction information and whether the user 120 is logged-in to certain applications or web services are traditionally known as presence information.

In addition to presence information, contextual information may also be considered to include communication context information (e.g., whether and to what extent the user 120 is communicating with other users via the user device 116), location context information, group context information, calendar information, etc. With respect to location context information, the contextual information source 112 may be configured to determine location (physical or logical) information for the user 120 and/or the user device 112 associated with the user 120. In some embodiments, physical location information can be obtained via GPS technology, cellular-locating technology, network access point usage information, etc. Specifically, the user device 116 may be provided with a GPS module that enables the user device 116 to determine is currently geographical location and that information can be continuously or periodically sent to the contextual information source 112. If the user device 116 is accessing the communication network 104 via a particular access point having a fixed and known location (e.g., an 802.11N wireless access point), then that location information can be transmitted to the contextual information source 112.

Physical location information can also be determined by monitoring the user's 120 movement within the access control system 124. Specifically, if a user 120 is determined to have entered (or exited) a certain ingress/egress point within the access control system 124, then the user's 120 location information can be correlated to an associated location within the access control system 124 (e.g., a building, room, office, etc.) within the access control system 124.

To summarize, the contextual information source 112 may serve as both an aggregator and repository for contextual information for users 120. Contextual information can be obtained by the contextual information source 112 passively and/or actively, periodically or continuously, directly or indirectly, depending upon the node from which the information is obtained and the permissions granted b the user 120. For instance, the users 120 may be subscribe to the contextual information source 112 and allow it to monitor certain actions of the user to determine contextual information. As another example, the contextual information source 112 may not necessarily need to monitor the user device 116, but rather the contextual information source 112 may monitor web services that are used by the user 120 (e.g., communication applications such as IM, peer-to-peer, etc.) that require the user 120 to log-in for access to the services. The user 120 may also grant the contextual information source 112 access to his/her calendar (personal or business) to determine group and/or schedule context information. By having access to the user's 120 calendar, the contextual information source 112 can determine whether the user 120 is scheduled to be in a meeting, scheduled to be at a particular location or time zone, etc.

Accordingly, it should be appreciated that contextual information may include presence information, communication context information, location context information, group context information, calendar information, etc. The contextual information obtained by the contextual information source 112 can be provided to the credential control authority 108 and the credential control authority 108 may compare the contextual information with rules and thresholds to determine if based on the current contextual information for a user 120, whether one or more credentials for the user 120 should be updated. Alternatively, or in addition, the contextual information source 112 may be programmed with one or more of the rules/thresholds to help the contextual information source 112 determine whether and when updated contextual information should be provided to the credential control authority 108.

Figure 2:
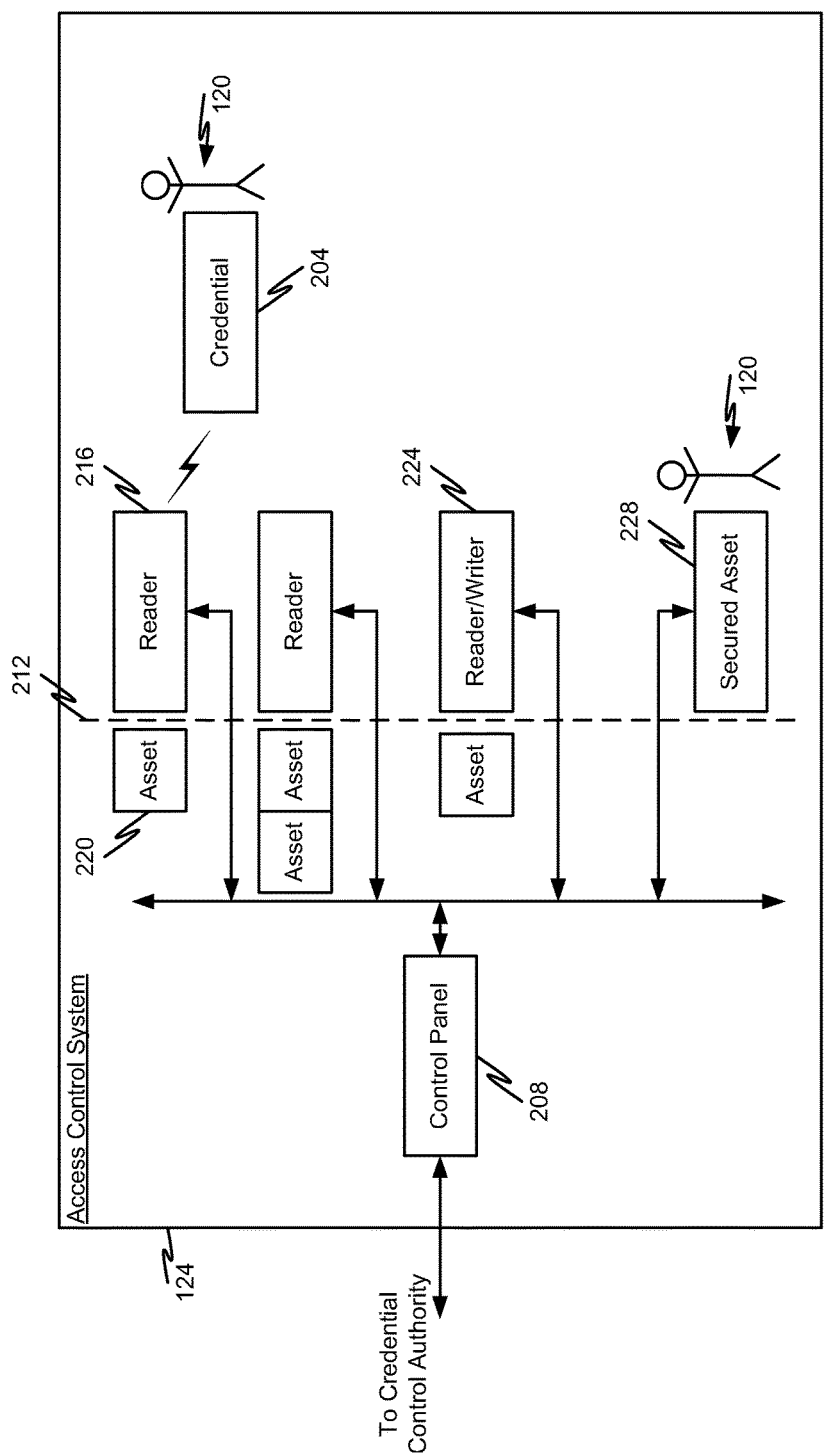
FIG. 2 is a block diagram depicting an access control system in accordance with embodiments of the present disclosure.

With reference now to FIG. 2, additional details of the access control system 124 will be described in accordance with at least some embodiments of the present disclosure. As discussed above, the access control system 124 may comprise both a PACS 128 and/or LACS 132. The delineation between whether a component is part of the PACS 128 or LACS 132 may depend upon the type of asset 220 that is being protected within the access control system 124. Specifically, logical assets (e.g., data, applications, financial information, bank accounts, etc.) and the components that control access to those assets may be considered part of the LACS 132 whereas physical assets (e.g., buildings, rooms within buildings, areas within rooms, safes, hardware, physical servers, computers, phones, etc.) and the components that control access to those assets may be considered part of the PACS 128.

As can be seen in FIG. 2, the access control system 124 may comprise one or more portable access-control credentials 204 that are issued to a user 120. The portable access-control credentials 204 may simply be the user device 116 discussed above in connection with FIG. 1. For example, the credential 204 may correspond to an NFC-enabled smart phone or the like. The credential 204, as described herein, may alternatively be a sub-component of the user device 116 or it may be separate from the user device 116. Credentials 204 may also be in other form factors such as card-type credentials, stickers, key fobs, Integrated Circuit (IC) chips, microprocessors within the user device 116, and the like. Physical credentials 204 may carry logical credentials (e.g., access permissions in the form of data and protocols for communicating the data) that are communicated by the physical credential 204 to readers 216 and/or reader writers 224 via predefined protocols.

The credential 204 serves as a representation of the user 120 to the access control system 124—it represents something that the user 120 has. In some embodiments, the user 120 may be required to present the credential 204 to a reader 216 or reader/writer 224 to prove that the user 120 is allowed to access an asset 220 protected by the reader 216 or reader/writer 224. It may also be required that the user 120 prove he/she has knowledge of a secret to gain access to an asset 220. In other words, the user 120 may be required to prove that he/she knows something in addition to or in lieu of having something (e.g., having the physical credential 204 with the appropriate logical credentials stored thereon).

FIG. 2 shows a security boundary 212 that is maintained to secure assets 220 of the access control system 124. This boundary 212 is established and maintained between the user 120 and the assets 220 unless and until the user 120 proves that he/she is permitted to access the asset 220. In some embodiments, access permissions may be proven when the user 120 presents a valid physical credential 204 to a reader 216 and/or reader/writer 224 and the credential 204 comprises valid logical credential(s) (e.g., access permissions and instructions for communicating the same). In some embodiments, the reader 216 and/or reader/writer 224 may comprise functionality to analyze credential information received from a physical credential 204 and determine if the received credential information is currently valid. In some embodiments, the reader 216 and/or reader/writer 224 may communicate the received logical credentials to a control panel 208 in the access control system 124 and the analysis of the validity of the logical credentials may be performed at the control panel 208. Results of this analysis may be sent back to the appropriate reader 216 and/or reader/writer 224 where the user 120 is either allowed to access the asset 220 or not.

In some embodiments, the control panel 208 may be physically wired to some or all readers 216 and/or reader/writers 224. In some embodiments, one or more of the readers 216 and/or reader/writers 224 may be disconnected from the control panel 208. Such readers 216 and/or reader/writers 224 are referred to as non-networked or stand-alone readers and are described in more detail in U.S. Pat. No. 8,074,271, the entire contents of which are hereby incorporated herein by reference.

In some embodiments, the readers 216 and/or reader/writers 224 may communicate with the physical credential 204 using known wireless communication protocols. For instance, data can be exchanged between the credential 204 and a reader 216 by data modulation of a carrier wave having a particular carrier frequency (e.g., 125 kHz, 13.56 MHz, ultra-high frequencies, etc.).

One or more of the readers 216 and/or reader/writers 224 may correspond to so-called dual-factor authentication devices which require the user 120 to both present a valid credential 204 to prove something they have and provide a valid credential to prove something they know.

In some embodiments, an asset may itself be secured by embedded technology (e.g., a secured asset 228). These types of assets may comprise logical or physical assets, but most often correspond to logical assets. One example of a secured asset 228 is a computer connected to a computing network. The computer may be password-protected, which means that the software components and network resources available via the computer are not available unless and until a user 120 enters a valid password. In some embodiments, the secured asset 228 may also require that the user 120 present a valid physical credential 204 prior to allowing the user to access the secured asset 228.

Figure 3:
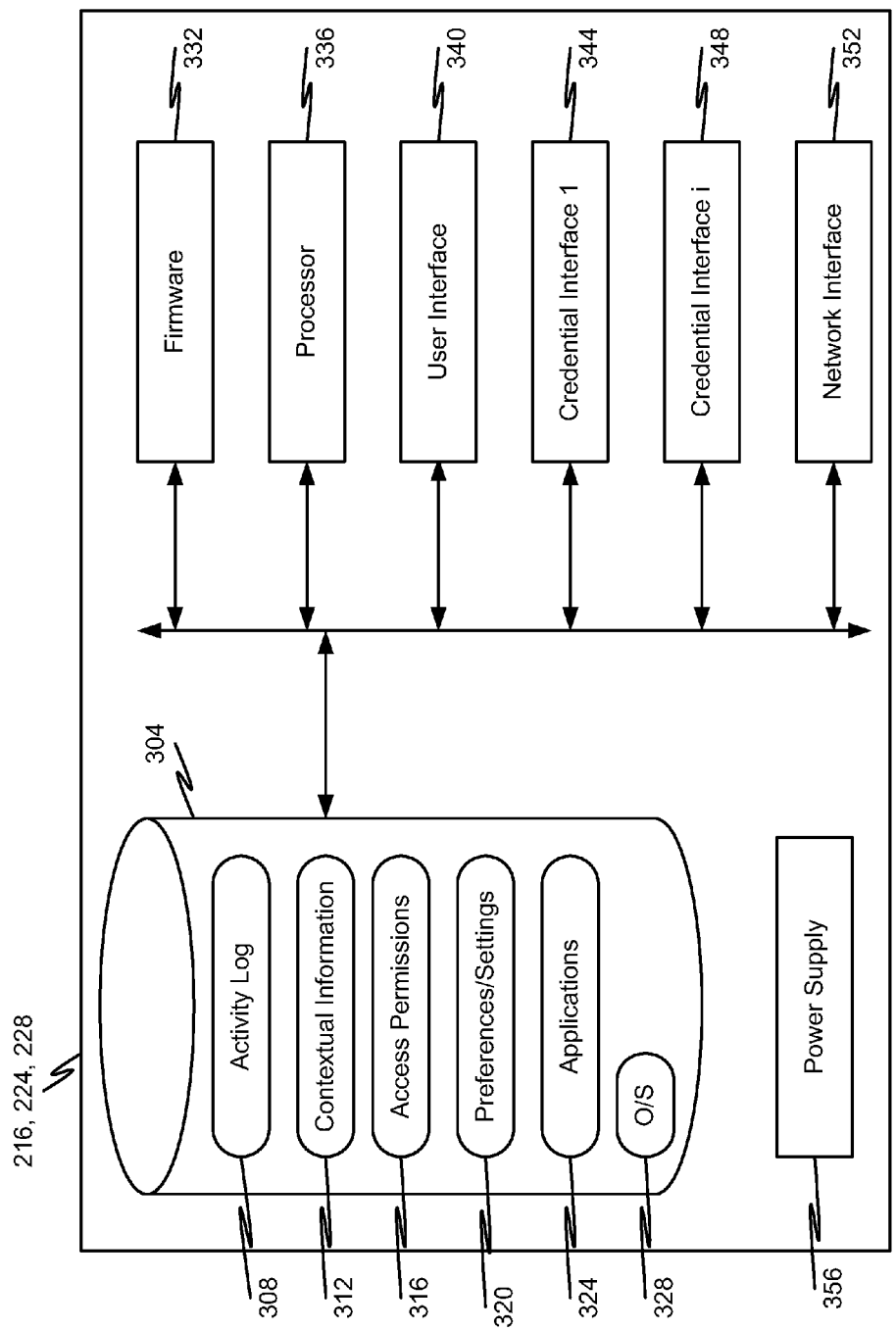
FIG. 3 is a block diagram depicting details of a reader or reading/writing device in accordance with embodiments of the present disclosure.

Referring now to FIG. 3, additional details of a reader 216, reader/writer 224, and/or secured asset 228 (referred to as a "local host" for convenience) will be described in accordance with at least some embodiments of the present disclosure. In some embodiments, a local host may comprise memory 304, firmware 332, a processor 336, a user interface 340, one or more credential interfaces 334, 348, a network interface 352, and/or a power supply 356.

As discussed in connection with FIG. 2, a local host can be typically associated with a particular asset (e.g., a door protecting access to a secure room, a computer lock protecting sensitive information or computer files, a lock on a safe, a bank account, a credit card, and the like). When the local host operates as a pure reader that controls access to an asset, the local host may analyze one or more logical credentials received from a user device 116 and/or physical credential 204 and upon verification of the logical credential(s), the local host generates one or more signals facilitating execution of the results of interrogating the user device 116 and/or physical credential 204 (e.g., engages/disengages a locking mechanism, allows/disallows movement of a monitored article, temporarily disables itself, activates an alarm system, provides access to a computer system, provides access to a particular document, authorize a purchase/withdrawal, and the like). If the logical credential is not verified by the local host or is determined to be fraudulent, nothing may happen, the presented device may be rejected, and/or alarms may be triggered alerting security personnel. Alternatively, the control panel 208 in communication with the local host may generate such signals.

The processor 336 may include any general-purpose programmable processor, digital signal processor (DSP) or controller for executing application programming contained in memory 304. Alternatively, or in addition, functionality of the local host may be executed within firmware 332. In some embodiments, the processor 336 may comprise a specially configured application specific integrated circuit (ASIC). The firmware 332 and/or processor 336 generally function to run programming code implementing various functions performed by the local host.

In addition to executing functions in connection with reading logical credentials, the firmware 332 and/or processor 336 may execute functions in response to receiving messages from the credential control authority 108. In particular, the firmware 332 and/or processor 336 may be configured to update information in memory 304 (e.g., access permissions 316, preferences/settings 320, etc.) in response to receiving one or more credential update commands from the credential control authority 108.

The memory 304 generally comprises software routines or instructions facilitating, in operation by the processor 336, pre-determined functionality of the local host. The memory 304 may be implemented using various types of electronic memory generally including at least one array of non-volatile memory cells (e.g., Erasable Programmable Read Only Memory (EPROM) cells or FLASH memory cells, etc.) The memory 304 may also include at least one array of dynamic random access memory (DRAM) cells. The content of the DRAM cells may be pre-programmed and write-protected thereafter, whereas other portions of the memory may selectively be modified or erased. Other types of known memory devices may be used as memory 304 such as, for example, Read Only Memory (ROM), Static RAM (SRAM), virtual memory, cache memory, or any other type of volatile or non-volatile memory device. In particular, memory 304 may include any device or collection of physical devices that are used to store programs (e.g., sequences of instructions) or data (e.g. program state information) on a temporary or permanent basis for use by the local host or some other peripheral device.

One data structure of set of data structures that may be stored in memory is an activity log 308. The activity log 308 may comprise historical information regarding credentials 204 presented to the local host as well as results of the analysis of the logical credential obtained from the physical credential 204. For example, the activity log 308 may comprise time and date information describing when credentials 204 were presented to the local host and what actions were preformed in response thereto. Other information that may be maintained in the activity log 308 is a historical record of credential update processes that have been performed at the local host. Given the potentially sensitive nature of the activity log 308, the activity log 308 may be maintained in a secure area of memory 304 (e.g., in a password-protected area) or may be otherwise secured, for example, as an encrypted data structure.

The memory 304 may also be used to store contextual information 312. The contextual information 312 may correspond to contextual information received from the contextual information source 112, contextual information or contextual-based instructions received from the credential control authority 108, or the like. The contextual information 312 stored on the local host may be used to allow the local host to determine whether to perform a credential update process for information stored thereon. Specifically, in some embodiments, the memory 304 may include access permissions 320 and/or preferences/settings 320. This information may be updated, changed, deleted, enhanced, etc. as part of a credential update process that is triggered based on the contextual information 312 and/or based on instructions received from the credential control authority 108.

The access permissions 316 may correspond to validation rules contained within the local host that are used to validate (or invalidate) credentials 204 presented to the local host. More specifically, the access permissions 316 may comprise one or more rules, data structures, etc. that can be used during the analysis of a logical credential received from a credential 204. The access permissions 316 may comprise instructions for mutually authenticating with the credential 204 as well as for analyzing whether the logical credential information received at the local host is valid or invalid. As some non-limiting examples, the access permissions 316 may comprise one or more data structures that define credentials 204 or users 120 that are allowed to access the asset 220 protected by the local host and any conditions upon which such access is predicated (e.g., group conditions, timing conditions, timing exclusions, etc.).

In some embodiments, the access permissions 316 may comprise an access control application that includes instructions for limiting/controlling access to the asset associated with the local host. The access control application contained in the access permissions 316 may include authentication algorithms and validation algorithms along with data that is accessible via those algorithms to help the local host determine what credentials 204 are allowed access to the asset. In some embodiments, a list of allowed credentials 204 may be stored as a part of the access permissions 316.

In some embodiments, the local host may perform authentication functions (e.g., mutual authentication), but does not perform credential validation functions. Rather, the local host provides logical credential information from to the control panel 208 for validation. When the control panel 208 determines that the credential 204 or the user 120 thereof is allowed to access the asset protected by the local host, the control panel may send a signal to the local host that prompts the local host to allow access to the asset. In other embodiments, the local host may be a stand-alone device and all of the validations are performed at the local host instead of relying upon a control panel 208. In such circumstances the local host may not even include a network interface 352.

The preferences/settings 320 may comprise information that controls the behavior of the local host and this data may be provisioned by an administrator of the access control system 124. In some embodiments, the preferences/settings 320 may comprise rules that define how the local host is to act or react under certain operating conditions. The preferences/settings 320 may also comprise data that describes how the local host should interact with other devices either directly or via the communication network 104. The specific types of behaviors that may be defined in the preferences/settings 320 include, for example, whether and how communications should be encrypted/decrypted, how the local host should react to credential validation, how the local host should react to credential invalidation, etc.

In some embodiments the memory 304 may also store one or more applications 324 and/or an Operating System (O/S) 328. The O/S 328 is an example of a high-level application that enables a user to navigate among other applications 324 and also provides the other applications 324 access via one or more APIs to the hardware components of the local host. The O/S 328 may be optional, especially when firmware 332 resides on the local host. The O/S 328 may be more likely a part of the local host when the local host corresponds to a secured asset 228.

The applications 324 may include any type of application known to be stored by or executed within a local host. Examples of such applications 324 include, without limitation, communication applications, word-processing applications, security applications, calendaring applications, etc.

The user interface 340 of the local host may provide a user 120 with the ability to interact directly or indirectly with the local host. In some embodiments, the user interface 340 may include one or more user input devices, one or more user output devices, and/or a combination user input/output device. Examples of user input devices include, without limitation, buttons, keys, microphones, touch pads, cameras, peripheral devices and ports/drivers for the same (e.g., pointing devices like a mouse, a rollerball/trackball, a stylus, etc.), etc. Examples of user output devices include, without limitation, speaker(s), Light Emitting Diode(s) (LEDs), an array of LEDs, displays (e.g., CRT display, LCD display, plasma display, etc.), tactile outputs (e.g., vibrators), and the like. One example of a suitable combination user input/output device is a touch-sensitive display. The touch-sensitive display, in some embodiments, may correspond to a capacitive-sensing LCD display that is configured to simultaneously display information to a user and detect user input in the same display area.

The various credential interfaces 344, 348 of the local host may comprise one or more components that enable the local host to exchange logical credentials and other information with a physical credential 204. Each credential interface 344, 348 may enable the local host to communicate with different types of credentials 204. As some non-limiting examples, a first credential interface 344 may facilitate communications with credentials 204 of a first type via carrier waves having a carrier frequency of approximately 13.56 MHz. A second credential interface may facilitate communications with credentials 204 of a second type via carrier waves having a carrier frequency that is different from the frequency used by the first type of credentials (e.g., 125 kHz, 300 MHz, 3 GHz, etc.). Other credential interfaces may facilitate contact-based communications with credentials. For example, a credential interface may include a magstripe reader, a contact-based electrical reader, etc. Other credential interfaces that are suitable for use in the local host include, without limitation, a barcode scanner, Wiegand readers, a video camera, a retina scanner, a fingerprint scanner, and the like. The credential interfaces 344, 348 may include both the hardware (e.g., antennas, capacitors, inductors, filters, transistors, modulators, demodulators, etc.) for capturing logical credentials and/or sending instructions as well as the instructions (e.g., drivers) to operate the hardware and interface the hardware with other components of the local host.

Although the local host is depicted as having multiple credential interfaces 344, 348, it should be appreciated that a local host may include only one credential interface 344 or potentially no credential interface. It should also be appreciated that the number of credential interfaces 344, 348 provided on the local host is virtually limitless and may correspond to any value greater than zero.

The network interface 352 may be provided to connect the local host to the communication network 104, a control panel 208, and/or the credential control authority 108. In some embodiments, the network interface 352 is an optional component. The network interface 352 may be a single network interface or multiple interfaces. Examples of suitable network interfaces 352 include, but are not limited to, a network interface card, a modem, a USB port, a parallel port, a serial port, a Small Computer Systems Interface (SCSI) port, an RS-232 port, an RJ-45 port, a Wiegand port, an Ethernet port, an infrared port, an RF interface, and/or other wired or wireless communication network interfaces.

The power supply 356 of the local host may correspond to an internal power supply (e.g., batteries, capacitors, super capacitors, local solar cells and energy converters, etc.). Alternatively, or in addition, the power supply 356 may correspond to an AC-to-DC power converter that converts power received from an external AC power source (e.g., 120V, 60 Hz AC power) into DC power that is useable by the components of the local host.

Figure 4:
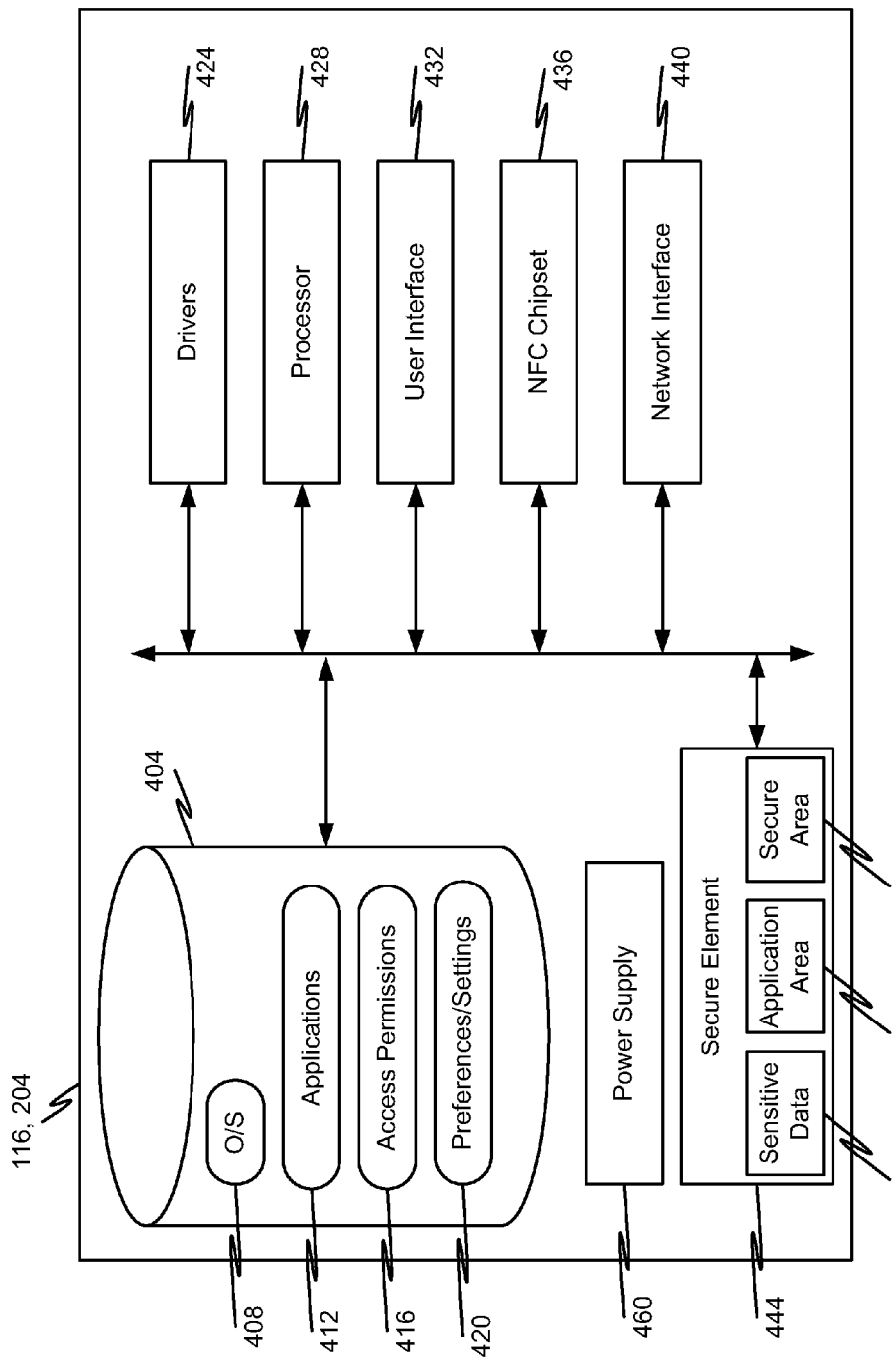
FIG. 4 is a block diagram depicting details of a portable physical credential in accordance with embodiments of the present disclosure.

With reference now to FIG. 4, additional details of a user device 116 and/or credential 204 (referred to as a "physical credential" for convenience) will be described in accordance with embodiments of the present disclosure. In particular, the physical credential may comprise memory 404 and a host processor 428 for executing instructions stored in memory. The memory 404 and host processor 428 are typically used to control the basic functionality of the physical credential (e.g., communication functionality, user interface functionality, etc).

In particular, the memory 404 may be similar or identical to memory 304 and comprise instructions for executing an O/S 408, instructions for executing one or more applications 412, and preferences/settings 420 that control the manner in which the O/S 408 and/or applications 412 are executed. In some embodiments, the O/S 408 corresponds to a high-level application that enables a user to interact with the other applications 412 as well as engage certain hardware functions of the physical credential. Examples of a suitable O/S 408 include, without limitation, Palm OS, webOS, BlackBerry, Windows Mobile, Symbian, Android, iPhone OS, and the like.

The applications 412 executed by the host processor 428 may include basic applications (e.g., communication applications, calendaring applications, networking applications, etc.) as well as more specific applications (e.g., gaming applications, media player applications, web-browsing applications, etc.).

The host processor 428 may include any general-purpose programmable processor, microprocessor, digital signal processor (DSP) or controller for executing application programming. Alternatively, the processor 428 may comprise one or a number of specially configured Application Specific Integrated Circuits (ASICs).

In some embodiments, the memory 404 may also be used to store access permissions 416. The access permissions 416 may include logical credentials as well as instructions for communicating the logical credentials to a local host. It should be appreciated that some logical credentials may be sensitive, in which case the access permissions may include instructions for encrypting the logical credentials before they are transmitted to a local host. The logical credentials do not, however, need to correspond to sensitive information. The access permissions may also comprise information that enables the physical credential to mutually authenticate with a local host. In some embodiments, these access permissions 416 may be updated in response to receiving one or more messages from a credential control authority 108. In other embodiments, the access permissions 416 may have timing-out mechanisms that cause the underlying data (e.g., logical credentials) to become invalid after a certain amount of time.

In some embodiments, logical credentials may be stored on the physical credential in a secure element 444, rather than being stored in memory 404. Specifically, rather than storing the access permissions 416 in memory 404, sensitive data 448 can be maintained in the secure element 444 and possibly within a secure area 456 of the secure element 444. The secure area 456 may include an area of memory that is encrypted or otherwise secured with one or more encryption keys. In some embodiments, the secure area 456 corresponds to a processing resource within the secure element 444 that is configured to process the sensitive data 448 based on instructions contained in the application area 452. In should be appreciated that multiple different applications (e.g., banking applications, physical access applications, etc.) may be stored in the application area 452 and common sensitive data 448 may be used by each of the applications. For security purposes, the secure area 456 may be used to process each of the applications individually and separately, thereby preventing each application from having access to other applications or data that it should not have access to.

The secure element 444 may also comprise an application area 452 that provides storage space for application data (e.g., instructions for executing an application and state information used when executing the application). The secure element, in some embodiments, comprises is own dedicated processor that is separate from the processor 428. The secure element 444 may comprise one or more of a SIM card, integrated chips, microSD cards, and the like. The secure element may be a separate chip or chipset or it may be embedded in the physical credential (e.g., incorporated into the host processor 428). Embedded secure elements 444 may be particularly useful to provide secure applications that are independent of the network operator.

In addition to having the secure element 444, or as part of the secure element 444, the physical credential may also comprise an NFC chipset 436 that enables NFC data exchanges between the physical credential and the local host. In some embodiments, the NFC chipset 436 may correspond to any NFC-compatible smartcard, chip, circuitry, etc.

The NFC chipset 436 may enables the physical credential to communicate in accordance with the NFC protocol. In some embodiments, the NFC chipset 336 can be native to the physical credential or it may be a separate component that is inserted into the physical credential.

In some embodiments, a credential update message transmitted by the credential control authority 108 may be received at the physical credential initially at the processor 428. The processor 428 may be configured to update the access permissions 416 and/or provide the message to the secure element 444 without further processing of the message. If the secure element 444 receives the credential update message, the secure element 444 may decrypt, if necessary, the message and update sensitive data 448 and/or application data in the application area 452 in accordance with the instructions contained in the credential update message.

When the physical credential is presented to a local host, the NFC chipset 436 may become activated (e.g., due to mutual inductance with the RF field created by the credential interface 344, 348 of the local host) and the activation of the NFC chipset 436 may cause the secure element 444 to begin processing one or more applications 452. Specifically, the secure element 444 may alter the data provided to the NFC chipset 436 depending upon the nature of the local host to which the physical credential is being presented. If the physical credential is being presented to a local host protecting a logical asset, then the secure element 444 may retrieve the necessary credential information to access that logical asset. If the physical credential is being presented to a local host protecting a physical asset, then the secure element 444 may retrieve different credential information to access the physical asset. The NFC chipset 436 may then communicate the credential information to the local host via the NFC protocol. Accordingly, as can be appreciated, the NFC chipset 436 may include an RF antenna that can establish an inductive coupling with other NFC-enabled devices (e.g., local hosts, other physical credentials having NFC chipsets, etc.).

In addition to providing the capability to distribute credential information to a local host, the NFC chipset 436 may also be used to communicate credential update messages to other NFC-enabled devices. For example, if the physical credential receives a credential update message, some or all of the instructions contained in that message may be distributed to other devices via the NFC chipset 436. As can be appreciated by those of ordinary skill in the art, the NFC chipset 436, may be embodied on a single IC and more specifically may be combined into a single component.

The network interface 440 may include any type of known antenna, modulation/demodulation unit, encoder/decoder, and any other hardware or software functionality required to communicate over the communication network 104.

In addition to the components described above, the physical credential may further comprise a user interface 432 which enables a user 120 of the physical credential to interact with the O/S 408 and/or applications 412 on the physical credential. In some embodiments, the user interface 432 comprises one or more user inputs (e.g., keypads, buttons, microphones, video cameras, still cameras, etc.), one or more user outputs (e.g., lights/indicators, display screens, speakers, etc.), and/or combination user input/outputs (e.g., touchscreen).

The drivers 424 may be used to control the various hardware components of the physical credential. In some embodiments, the drivers 424 include a computer program allowing higher-level computer programs (e.g., applications 412, O/S 408, etc.) to interact with a hardware device (e.g., NFC chipset 436, secure element 444, network interface 440, etc.). A driver 424 typically communicates with the hardware device through a bus or communications subsystem to which the hardware connects. When a calling program invokes a routine in the driver 424, the driver 424 issues commands to the device. Once the device sends data back to the driver 424, the driver 424 may invoke routines in the original calling program. Drivers 424 are often hardware-dependent and/or O/S 408 dependent.

Figure 5:
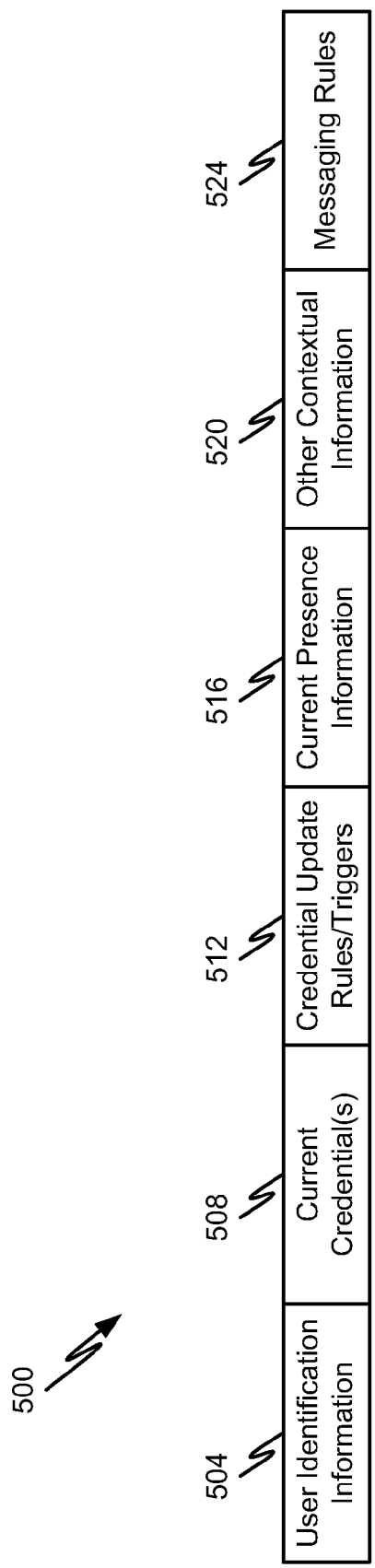
FIG. 5 is a block diagram depicting details of a data structure used in accordance with embodiments of the present disclosure.

With reference now to FIG. 5, details of an example data structure 500 that may be used in accordance with embodiments of the present disclosure will be described. The data structure 500 may comprise a plurality of fields to facilitate the management of logical credentials and/or access permissions 316 in an access control system 124. In some embodiments, the data fields that may be included in the data structure 500 include a user identification information field 504, a current credential field 508, an update rules/triggers field 512, a current presence information field 516, a contextual information field 520, and a messaging rules field 524. Some of all of the data fields may be maintained in a single data structure that is stored on or otherwise made available to any one of the components of the communication system 100. Furthermore, the data structure 500 may be separated among a plurality of different components in the communication system 100. As an example, the data structure 500, or portions thereof, may be maintained in the credential control authority 108. As another example, the data structure 500, or portions thereof, may be maintained in the contextual information source 112. As yet another example, the data structure 500, or portions thereof, may be maintained in the user device 116, a physical credential 204, or any component of the access control system 124.

The user identification information field 504 may comprise information describing the user 120 either globally uniquely or uniquely within the access control system 124. Examples of information that can be stored in the user identification information field 504 includes, without limitation, name, user name, aliases, identification numbers (e.g., social security numbers, randomly-assigned numbers, employee numbers, passport numbers, account numbers, phone numbers, etc.), email addresses, website sign-on information, and combinations thereof. Generally speaking, any information that can be used to identify either a user 120, a user device 116 associated with a user 204, a physical credential 204 associated with a user 120, or the like can be maintained in the user identification information field 504 and may be used to associate the user 120 with various other types of data in the data structure 500 (e.g., logical credentials, rules for updating logical credentials, current contextual information, messaging preferences, etc.).

The current credential information field 508 may comprise information that describes logical credentials that are currently assigned or otherwise made available to a user 120. These logical credentials may be in the form of local host identifiers and/or associated times during which the user 120 identified in the user identification information field 504 is allowed access to assets protected by the local host. In some embodiments, the current credentials field 508 may comprise a whitelist of assets 220 and/or associated local hosts to which the user 120 has been granted access and, if applicable, any conditions upon such access. Alternatively, or in addition, the current credentials field 508 may comprise a blacklist of assets 220 and/or associated local hosts to which the user 120 is not granted access. In some embodiments, the current credentials field 508 may comprise programming instructions for determining whether a user 120 is allowed access to an asset 220 based on certain variables (e.g., location, time, etc.).

The credential update rules/triggers field 512 may comprise information that describes when and how one or more components of the current credentials 508 assigned to a user 120 should be updated. Specifically, the rules/triggers field 512 may comprise one or more thresholds, equations, functions, or the like that map contextual information or contextual states to logical credentials or credential states. If the current state of logical credentials for a user 120 is not the same as the state dictated by the current contextual state, then the credential update rules/triggers 512 may dictate that a credential update message should be transmitted to one or more components of the access control system 124, user device 116, or physical credential 204 to effect an update of the logical credentials for the user 120. The rules/triggers 512 may also comprise timing-out mechanisms that cause one or more current credentials 508 to become obsolete or otherwise unusable unless an activating credential update message is received. This may provide an additional layer of security, especially with respect to access control systems 124 that require credentials to be constantly updated and/or activated.

As noted above, the rules/triggers 512 may depend upon current presence information 516 and other contextual information 520 stored in the data structure 500. These data fields may correspond to permanent or temporary storage locations for contextual information, presence information, and any other state information that is relevant as an input to the rules/triggers 512. Furthermore, the nature of the information stored in the fields 516, 520 may vary depending upon whether the data structure 500 is in the contextual information source 112, the credential control authority 108, the user device 116, or any other component described herein.

The messaging rules 524 may be referenced during the generation and transmission of a credential update message. In particular, the messaging rules 524 may describe the message type to be used to distribute a credential update message, the media type (e.g., audio, text, multi-media, etc.) to be used for the credential update message, and other aspects to follow in connection with generating and distributing the credential update message.

Figure 6:
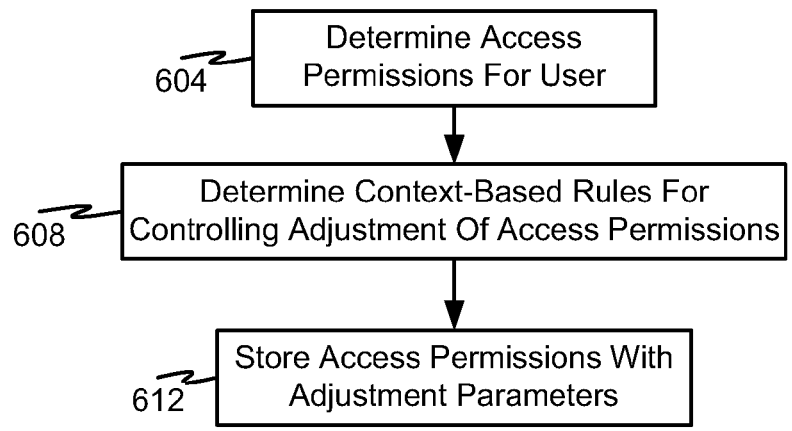
FIG. 6 is a flow diagram depicting a method of administering access permissions in accordance with embodiments of the present disclosure.

With reference now to FIG. 6, a method of administering access permissions and corresponding logical credentials will be described in accordance with at least some embodiments of the present disclosure. The method begins when access permissions for a user 120 or group of users is determined for one or more assets in an access control system 124 (step 604). Depending upon the nature and quality of the determined access permissions, a subsequent step may involve determining context-based rules for controlling the adjustment, maintenance, etc. of the access permissions and associated logical credentials that control the user's access (step 608). The determined access permissions 316, 416 and any associated logical credential (e.g., sensitive data 448, credentials 508, and so on) may then be stored along with the context-based adjustment parameters (e.g., rules/triggers 512) that can be used to control the updating of the logical credentials (step 612).

Figure 7:
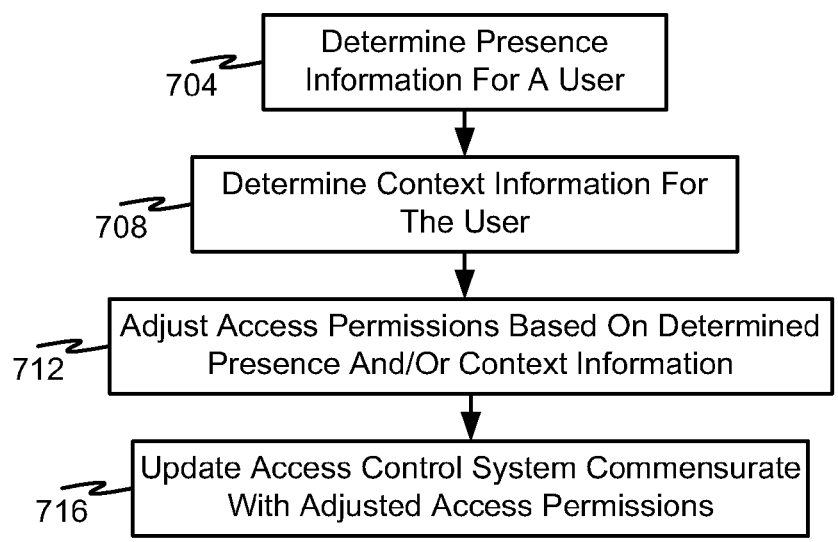
FIG. 7 is a flow diagram depicting a method of updating access permissions in accordance with embodiments of the present disclosure.

With reference now to FIG. 7, a method of updating access permissions will be described in accordance with at least some embodiments of the present disclosure. The method begins with the contextual information source 112 determining presence information (logical or physical) for a user 120 (step 704). The contextual information source 112 may also determine contextual information for the user 120 (step 708). The contextual information for the user 120 may be determined simultaneous with determining presence information, prior to determining presence information, or after determining presence information.

The contextual information source 112 may then analyze the credential update rules/triggers 512 to determine whether and to what extent access permissions and their associated logical credentials should be updated. Alternatively, or in addition, the credential control authority 108 may receive presence and/or contextual information for the user 120 from the contextual information source 112 and then use the received information along with the rules/triggers 512 to determine whether a credential update should be performed. If the rules/triggers 512 dictate that a credential update should be performed, then the credential control authority 108 will generate and distribute one or more credential update messages based on the determined presence and/or context information (step 712). The credential update message(s) may be transmitted to any number of components in the communication system 100 either directly or via the communication network 104.

Upon receiving a credential update message at a recipient component (e.g., local host, user device 116, credential 204, etc.), the access control system 124 is updated commensurate with the information contained in the credential update message (step 716). In particular, the component that received the credential update message may update either its access permissions 316, 416, sensitive data 448, and/or current credential 508 based on instructions contained in the credential update message.

Figure 8:
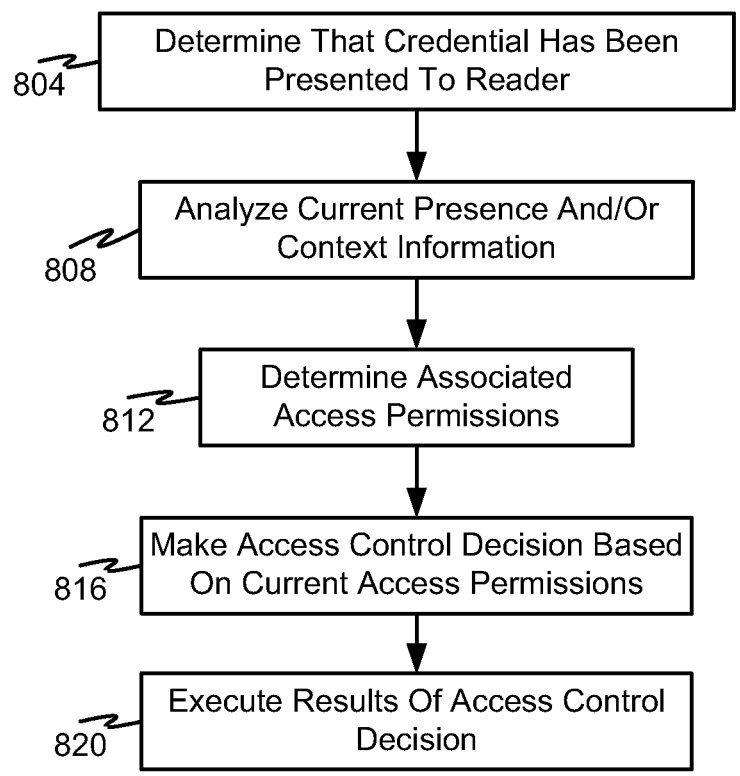
FIG. 8 is a flow diagram depicting a transaction method in accordance with embodiments of the present disclosure.

FIG. 8 depicts a transaction method in accordance with at least some embodiments of the present disclosure. The transaction method is initiated when a credential 204 or user device 116 is presented to a local host, such as a reader 216, reader/writer 224, or secured asset 228 (step 804). The presentation of the credential to the local host may simply comprise placing the physical credential within an active RF field that is being generated by the local host. Other forms of presentation include, without limitation, swiping the credential in the local host, inserting the credential in the local host, presenting the credential to the local host for visual/image-based analysis, and so on.

A next step may include mutually authenticating the credential and local host. Specifically, the local host may check certain aspects of the credential and vice versa to ensure that each entity is talking with a trusted or properly configured device. The method then continues with the local host or a control panel 208 analyzing current presence and/or context information 516, 520 (step 808) to determine the access permissions associated therewith (step 812). It may also be possible that the credential is a self-authenticating credential in which case the credential analyzes the current presence and/or context information 516, 520. It may also be possible that both the credential and the local host simultaneously perform some analysis of current presence and/or context information 516, 520.

The local host and/or credential may then make an access control decision based on the analyzed access permissions or comparison of the access permissions with current credentials 508 (step 816). Examples of access control decisions include determining that the credential is valid and authorized to access an asset, determining that the credential is invalid and not authorized to access an asset, determining that additional information is required to complete an access decision (e.g., the user 120 is also required to prove something they know).

The results of the access control decision can then be executed by the analyzing device along with the local host in the event that the local host was not the only analyzing device (step 820). In particular, if the analyzing device was not the local host, then the analyzing device (e.g., control panel 208 or credential) may send the local host one or more messages that include results of the analysis. The local host, in response to receiving the message or in response to making the access control decision itself may then decide whether to release the security which protects the asset.

In the foregoing description, for the purposes of illustration, methods were described in a particular order. It should be appreciated that in alternate embodiments, the methods and steps thereof may be performed in a different order than that described.

Additional, non-limiting examples, of ways in which logical credentials and/or access permissions can be updated in an access control system 124 will now be described without intending to limit the scope of the claimed invention.

Update as an Addition of a Credential

One example of the way in which a logical credential and/or access permission can be updated is by adding one or more new credentials for a user 120. The addition of a new credential in response to appropriate contextual information determined for the user 120 may be performed for a single logical credential or multiple logical credentials.

For example, a user 120 may initially be added as a recognized user to the access control system 124. Upon adding the user 120 to the access control system 124, the user may either have a set of default access permissions or no access permissions. In either event, one or more context-based rules 512 for adding a new access permission (e.g., new logical credential 508) for the user 120 can be established. When the behavior of the user 120 fulfills the context-based rules 512 for adding the new access permission, the credential control authority 108 may generate and send an appropriate credential update message to the user device 116 associated with the user so that a new credential 508 can be added to the permissions for the user (e.g., as sensitive data 448 in the secure element 444).

A more specific example would be when a customer of a hotel initially checks into a hotel or makes a reservation online. Upon confirming the reservation, the customer may request a remote check-in that will ultimately cause an access permission to be granted to the customer. However, granting of the access permission may not occur until the customer is within a predefined distance of the hotel or their room. Once it is determined by the contextual information source 112 that the customer has moved within the predefined distance of their hotel or room, the credential control authority 108 may send one or more credential update messages that cause the local host associated with protecting the customer's room (e.g., room 1200) to update its access permissions 316 as well as cause the customer's user device 116 to update its logical credentials (e.g., sensitive data 448 or access permissions 416). The updating of both the local host and user device 116 then enable the customer to go directly to their room and gain access to the room because both devices have been updated with the appropriate access permissions/logical credentials.

Update as a Revocation of a Credential

Another example of the way in which a credential is updated is by revoking an access permission and/or logical credential. In some embodiments, a user 120 may have a physical credential that has a valid logical credential 508 stored thereon. One or more rules/triggers 512 may define that the valid credential 508 is to be removed (e.g., erased from memory, re-written, etc.) from memory of the user's 120 physical credential.

Taking a more specific example, a customer of a hotel may have a user device 116 with a valid credential 508 stored thereon. However, one or more rules/triggers 512 may define that the customer should not retain the valid credential 508 when the customer is more than a predetermined distance away from a predetermined location (e.g., the customer's room, a building, a local host, etc.). Alternatively, or in addition, the rules/triggers 512 may define that the customer should not retain the valid credential 508 if the customer is detected as engaging in certain activities with his/her user device 116 (e.g., having a communication session with another user, utilizing a particular application, and so on). If the current presence information 516 or current contextual information 520 dictates that one or more current credentials 508 of a user should be revoked, then the credential control authority 108 may be tasked with transmitting to the user device 116 and/or components of the access control system 124 one or more credential update messages that cause the receiving device to erase, overwrite, or otherwise revoke or remove a previously valid credential or access permission.

Update as a Modification of a Credential

Yet another example of the way in which a credential is updated is by modifying an existing access permission and/or logical credential. In some embodiments, a user 120 may have a physical credential that has a logical credential 508 stored thereon. The currently stored credential 508 may be valid or invalid (e.g., expired). One or more rules/triggers 512 may define that the user 120 should be allowed to have that logical credential 508 modified, updated, or otherwise changed to either make the credential valid, ready for activation, or invalid.

As a more specific example, a customer of a hotel may select a rule/trigger 512 that controls when other associated customers (e.g., family members, guests, friends, etc.) should be allowed to have access to a room or other asset of the customer. These other associated customers may already have a valid logical credential 508 that enables them to access their room, a safe within their room, etc. However, if the customer of the hotel decides to grant one of these other associated customers additional access to their room in addition to the access already granter to another room, this additional access permission may be achieved by modification of the already valid logical credential. The rules/triggers 512 for determining whether and to what extent such credentials should be modified can be based on presence/context information for the customer granting access to the other associated customer (e.g., the permission granting customer), presence/context information for the other associated customer (e.g., the permission receiving customer), presence/context information for any other customers or non-customers, and son on.

Similar situations may arise for modifying a customer's logical credential if that customer receives compensations (comps), benefits, awards, prizes, or the like during their stay at the hotel. Thus, it may be relatively easy to change the room to which a customer is allowed access within a hotel and the triggers that control when such a change occurs can be based on presence and/or contextual information 516, 520.

Update as an Activation/Deactivation of an Existing Credential

Some valid credentials may have a timing-out mechanism or a time-to-live parameter. If such a logical credential is not reactivated before its timing-out mechanism ends, then the logical credential may become inactive. An inactive logical credential is an otherwise valid credential, but may not be capable of being transmitted to a local host. In other embodiments, an inactive logical credential may be a credential that has expired and needs to be replaced with a new credential (see credential modification).

In some embodiments, the credential control authority 108 may transmit a credential update message that simply causes a valid credential to have its time-to-live parameter reset so that it is granted a new active period of time. The converse may also be true. Specifically, the credential control authority 108 may transmit a credential update message that causes a valid credential to have its time-to-live parameter count down at an accelerated rate or become set to zero, thereby causing the associated logical credential to become inactive.

It should be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, SIMs, SAMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
    delivering at least one credential to at least one device associated with a first user, the at least one credential being unusable with one or more physical access control readers until activation, wherein the at least one credential is delivered to the at least one device at a first time, wherein the at least one device associated with the first user comprises a smart phone, and wherein the at least one credential is capable of being transmitted to the one or more physical access control readers prior to activation but is incapable of being verified by the one or more physical access control readers prior to activation;
    receiving contextual information regarding the first user, the contextual information including information describing one or more network devices with which the at least one device is in communication or has been in communication, wherein the contextual information is received at a second time that follows the first time, and wherein the one or more network devices comprise a network access point;
    based on the received contextual information, determining a credential update to perform in connection with the at least one device and the at least one credential delivered to the at least one device, the credential update corresponding to at least one action to take in connection with activating the at least one credential;
    generating a first message that contains at least one instruction to activate the at least one credential;
    transmitting the first message to the at least one device associated with the first user;
    generating a second credential activation message; and
    transmitting the second credential activation message to the one or more physical access control readers.

2. The method of claim 1, wherein the at least one device comprises a user device configured to exchange messages via a communication network.

3. The method of claim 2, wherein the first message is transmitted to the at least one device via the communication network in at least one of an SMS message, an email, and an HTTP request.

4. The method of claim 1, wherein the user device further comprises a secure element that stores the at least one credential as sensitive data in an encrypted format.

5. The method of claim 4, wherein the secure element corresponds to at least one of a SIM card, microSD card, removeable IC, and embedded IC.

6. The method of claim 1, wherein the network access point is located in physical proximity to the one or more physical access control readers.

7. The method of claim 1, wherein the at least one credential comprises multiple credentials.

8. The method of claim 1, wherein the contextual information regarding the first user further comprises presence information.

9. The method of claim 1, wherein the contextual information regarding the first user further comprises location information and an identifier of the one or more network devices.

10. The method of claim 1, wherein the contextual information regarding the first user further comprises information regarding the first user's usage of a particular application on the at least one device.

11. The method of claim 1, further comprising:
    based on the received contextual information, determining a credential update to perform in connection with at least one device associated with a second user, the second user being different than the first user;

generating a third message that contains at least one instruction to activate at least one credential for the second user; and transmitting the third message to the at least one device associated with the second user.

12. A non-transitory computer-readable medium comprising processor-executable instructions that are executable by a processor, the instructions comprising:

instructions that deliver at least one credential to at least one device associated with a first user, the at least one credential being unusable with one or more physical access control readers until activation, wherein the at least one credential is delivered to the at least one device at a first time, wherein the at least one device associated with the first user comprises a smart phone, and wherein the at least one credential is capable of being transmitted to the one or more physical access control readers prior to activation but is incapable of being verified by the one or more physical access control readers prior to activation;

instructions that receive contextual information regarding the first user, the contextual information including information describing one or more network devices with which the at least one device is in communication or has been in communication, wherein the contextual information is received at a second time that follows the first time, and wherein the one or more network devices comprise a network access point;

instructions that determine, based on the received contextual information, a credential update to perform in connection with the at least one device and the at least one credential delivered to the at least one device, the credential update corresponding to at least one action to take in connection with activating the at least one credential;

instructions that generate a first message that contains at least one instruction to activate the at least one credential;

instructions that transmit the first message to the at least one device associated with the first user instructions that generate a second credential activation message; and instructions that transmit the second credential activation message to the one or more physical access control readers.

13. A physical access control system, comprising:

memory that stores processor-executable instructions; and a processor that executes the processor-executable instructions thereby enabling the processor to:

deliver at least one credential to at least one device associated with a first user, the at least one credential being unusable with one or more physical access control readers until activation, wherein the at least one credential is delivered to the at least one device at a first time, and wherein the at least one credential is capable of being transmitted to the one or more physical access control readers prior to activation but is incapable of being verified by the one or more physical access control readers prior to activation;

receive at least one of presence information and contextual information associated with the user, the contextual information including information describing one or more network devices with which the at least one device is in communication or has been in communication, wherein the contextual information is received at a second time that follows the first time, and wherein the one or more network devices comprise a network access point;

determine that a credential update process is to be performed for the at least one device associated with the first user, the credential update corresponding to at least one action to take in connection with activating the at least one credential; and invoke the credential update process upon determining that the first user has crossed at least one of a physical and logical threshold based on the received at least one of presence information and contextual information, wherein the at least one device associated with the first user comprises a smart phone, and wherein the credential update process includes transmitting a first credential activation message to the one or more physical access control readers as well as transmitting a second credential activation message to the at least one device associated with the first user.

14. The system of claim 13, wherein the at least one of a physical and logical threshold corresponds to a predetermined distance away from a predetermined location.

15. The system of claim 13, wherein the at least one of a physical and logical threshold corresponds to a predetermined action of the first user detected at the at least one device associated with the first user.

16. The system of claim 13, wherein the one or more physical access control readers secure physical rooms of a facility and wherein the one or more network devices comprise network access points distributed throughout the facility.

17. The non-transitory computer-readable medium of claim 12, wherein the contextual information is received via a communication network.

18. The non-transitory computer-readable medium of claim 12, wherein the contextual information comprises group context information.

19. The non-transitory computer-readable medium of claim 18, wherein the group context information comprises contextual information for the first user and a second user.

20. The non-transitory computer-readable medium of claim 12, wherein the contextual information further comprises location information and an identifier of the one or more network devices.

* * * * *